(12) United States Patent
Strike

(10) Patent No.: US 9,195,771 B2
(45) Date of Patent: Nov. 24, 2015

(54) SYSTEM FOR CREATING AND METHOD FOR PROVIDING A NEWS FEED WEBSITE AND APPLICATION

(76) Inventor: Christian George Strike, Cincinnati, OH (US)

(*) Notice: Subject to any disclaimer, the term of this patent is extended or adjusted under 35 U.S.C. 154(b) by 397 days.

(21) Appl. No.: 13/206,158

(22) Filed: Aug. 9, 2011

(65) Prior Publication Data

US 2013/0041893 A1  Feb. 14, 2013

(51) Int. Cl.
G06F 17/30 (2006.01)

(52) U.S. Cl.
CPC ................... G06F 17/3089 (2013.01)

(58) Field of Classification Search
CPC .................................. G06F 17/3089
USPC ........................ 707/731, 769, 792
See application file for complete search history.

(56) References Cited

U.S. PATENT DOCUMENTS

| | | | |
|---|---|---|---|
| 5,905,981 | A | 5/1999 | Lawler |
| 7,028,259 | B1 | 4/2006 | Jacobson |
| 7,293,019 | B2 | 11/2007 | Dumais |
| 7,512,569 | B2 | 3/2009 | Isaacs |
| 7,581,166 | B2 | 8/2009 | Renger |
| 7,596,502 | B2 | 9/2009 | Dolle et al. |
| 7,627,600 | B2 | 12/2009 | Citron |
| 8,355,955 | B1 * | 1/2013 | Mirchandani et al. ........ 705/26.1 |
| 8,667,540 | B2 * | 3/2014 | Hoshall ............................ 725/53 |
| 2002/0049727 | A1 | 4/2002 | Rothkapf |
| 2005/0289147 | A1 | 12/2005 | Kahn |
| 2006/0004691 | A1 | 1/2006 | Sifry |
| 2006/0026147 | A1 | 2/2006 | Cone |
| 2006/0173985 | A1 | 8/2006 | Moore |
| 2006/0230021 | A1 | 10/2006 | Diab |
| 2007/0027932 | A1 | 2/2007 | Thibeault |
| 2007/0033290 | A1 | 2/2007 | Valen |
| 2007/0100836 | A1 | 5/2007 | Eichstaedt |

(Continued)

FOREIGN PATENT DOCUMENTS

| | | |
|---|---|---|
| WO | WO 2007/114741 A2 | 10/2007 |
| WO | WO 2008/113425 A1 | 9/2008 |

OTHER PUBLICATIONS

Edwin Addison, et al. "Extracting and Disseminating Information from Real-Time News." in *Proceedings of the Second International Conference on Artificial Intelligence Applications on Wall Street.* New York, NY, Apr. 1993, Gaithersburg, MD: Software Engineering Press (1993) pp. 14-18.

(Continued)

*Primary Examiner* — Apu Mofiz
*Assistant Examiner* — Cindy Nguyen
(74) *Attorney, Agent, or Firm* — Frost Brown Todd LLC

(57) ABSTRACT

A method for providing a news feed website and application. The method comprises the steps of receiving and storing a list of data sources, subject matter channels, and keywords in a database. The application assigns at least one subject matter channel to each keyword, at least one subject matter channel to each data source, and provides a keyword searcher. The keyword searcher searches the listed data sources for news articles containing at least one of the keywords. A graphical news feed containing the news articles found in the searching step is transmitted to a user. The website and application receives input from the user to modify the list of data sources, and the list of subject matter channels, and updates the list of data sources the list of subject matter channels in a database based on the input received from the user.

12 Claims, 25 Drawing Sheets

(56) References Cited

U.S. PATENT DOCUMENTS

| | | |
|---|---|---|
| 2007/0100959 A1 | 5/2007 | Eichstaedt |
| 2007/0124416 A1 | 5/2007 | Casey |
| 2007/0180027 A1 | 8/2007 | Boylan |
| 2007/0225047 A1 | 9/2007 | Bakos |
| 2007/0250577 A1 | 10/2007 | Veeramachaneni |
| 2008/0005086 A1* | 1/2008 | Moore .............................. 707/3 |
| 2008/0092054 A1 | 4/2008 | Bhumkar |
| 2008/0126476 A1 | 5/2008 | Nicholas |
| 2008/0140621 A1 | 6/2008 | Martinez |
| 2008/0256460 A1 | 10/2008 | Bickmore |
| 2009/0006285 A1 | 1/2009 | Meek |
| 2009/0080013 A1 | 3/2009 | Sato |
| 2009/0193100 A1 | 7/2009 | Moradi |
| 2009/0228774 A1* | 9/2009 | Matheny et al. ............... 715/201 |
| 2011/0113047 A1* | 5/2011 | Guardalben .................. 707/754 |
| 2011/0307478 A1* | 12/2011 | Pinckney et al. ............. 707/724 |
| 2012/0078981 A1* | 3/2012 | Gradin et al. ................. 707/812 |
| 2012/0278064 A1* | 11/2012 | Leary et al. ....................... 704/9 |

OTHER PUBLICATIONS

Vincent Lauria Product Manager, Meetro.com; *Introduction to Syndication*, (*RSS*) *Really Simple Syndication*; http://www.ibm.com/developerworks/xml/library/x-rssintro/index.html; Mar. 28, 2006; pp. 1-13.

*Feed Rinse*; http://feedrinse.com/; Electric Pulp, Interactive Agency, © 2012; p. 1.

* cited by examiner

Browser: NEWSF33D™ — Windows Internet Explorer
URL: http://newsf33d.com/index.php
Site: NEWSF33D™
Search: NEWSF33D.com | Google Search Tabs: Channel | Categories | Sources | Keywords | The Archives | Source Check | Products | Logout

Edit keyword
can not use keyword characters:

206 — Name (Keywords and Phrases) [ ]

207 — Sell Product(s) [ ]

208 — Additional Keywords and Phrases (separate with comma) [ ]

209 — Must INCLUDE Keywords and Phrases (seperate with comma) [ ]

210 — Threshold (required times above words or phrases must appear) [ ]

214 — EXCLUDE Keywords and Phrases (seperate with comma) [ ]

216 — External Keyword URL [ ]

217 — External URL Button Wording [ ]

218 — [SAVE]

Channels — 219

Art
☐ Comtenporary Art
☐ Street Art

Sports
☐ Baseball
☐ Basketball
☐ Football
☐ Skateboarding
☐ Snowboarding
☐ Surfing Music
☐ All & Rock
☐ Electronic
☐ Hip Hop
☐ Pop Fashion
☐ FashoIn Mens
☐ Fashion Womens
☐ Streetware
☐ Celebrity
☐ Design

SYSTEM FOR CREATING AND METHOD FOR PROVIDING A NEWS FEED WEBSITE AND APPLICATION

FIELD OF INVENTION

This invention relates to a system for creating and a method for providing a news feed website and application. More specifically, this invention relates to a system for creating and a method for providing a news feed website and application that includes user interactive components.

BACKGROUND

Various websites provide news feed services where a user is provided news information. Other sites provide content specific information services, such as blogs or websites. What is needed is a website and application that provides news information and content specific information that can be focused by the user and also provides a social networking component.

SUMMARY

This invention relates to a method for providing a news feed website and application comprising the steps of receiving and storing a list of data sources in a database, receiving and storing a list of subject matter channels in a database, receiving and storing a list of keywords in a database, assigning at least one subject matter channel to each keyword, assigning at least one subject matter channel to each data source, providing a keyword searcher, searching with the keyword searcher the listed data sources for news articles containing at least one of the keywords, transmitting a graphical news feed to a user, wherein the news feed contains the news articles found in the searching step, receiving input from the user to modify the list of data sources, receiving input from the user to modify the list of subject matter channels, updating the list of data sources in a database based on the input received from the user, and updating the list of subject matter channels in the database based on the input received from the user.

This invention also relates to a method for providing a news feed website and application comprising the steps of receiving and storing a list of data sources in a database, receiving and storing a list of subject matter channels in a database, receiving and storing a list of keywords in a database, assigning the list of data sources in a database and the list of subject matter channels in a database to a user, assigning at least one subject matter channel to each keyword, assigning at least one subject matter channel to each data source, providing a keyword searcher, searching with the keyword searcher the listed data sources for news articles containing at least one of the keywords, transmitting a graphical news feed to a user, wherein the news feed contains the news articles found in the searching step, receiving input from the user to modify the list of data sources, receiving input from the user to modify the list of subject matter channels, updating the list of data sources in a database based on the input received from the user, and updating the list of subject matter channels in the database based on the input received from the user.

This invention further relates to a method for providing a news feed website and application comprising the steps of receiving and storing a list of data sources in a database, receiving and storing a list of subject matter channels in a database, receiving and storing a list of keywords in a database, assigning the list of data sources in a database and the list of subject matter channels in a database to a user, assigning at least one subject matter channel to each keyword, assigning at least one subject matter channel to each data source, providing a keyword searcher, searching with the keyword searcher the listed data sources for news articles containing at least one of the subject matter search criteria, transmitting a graphical news feed to a user, wherein the news feed contains the news articles found in the searching step, transmitting a graphical input interface to a user, receiving input from the user through the graphical input interface to modify the list of data sources, receiving input from the user through the graphical input interface to modify the list of subject matter search channels, updating the list of data sources in a database based on the input received from the user, and updating the list of subject matter channels in the database based on the input received from the user.

BRIEF DESCRIPTION OF THE DRAWINGS

FIG. 9 is a representative administrator's graphical screen display of the invention showing a keyword list.

FIG. 10 is a representative administrator's graphical screen display of the invention showing how an administrator creates a new keyword.

DETAILED DESCRIPTION OF THE INVENTION

US Pub. No. US 2006/0173985 is incorporated into this application in its entirety.

Figure 12:
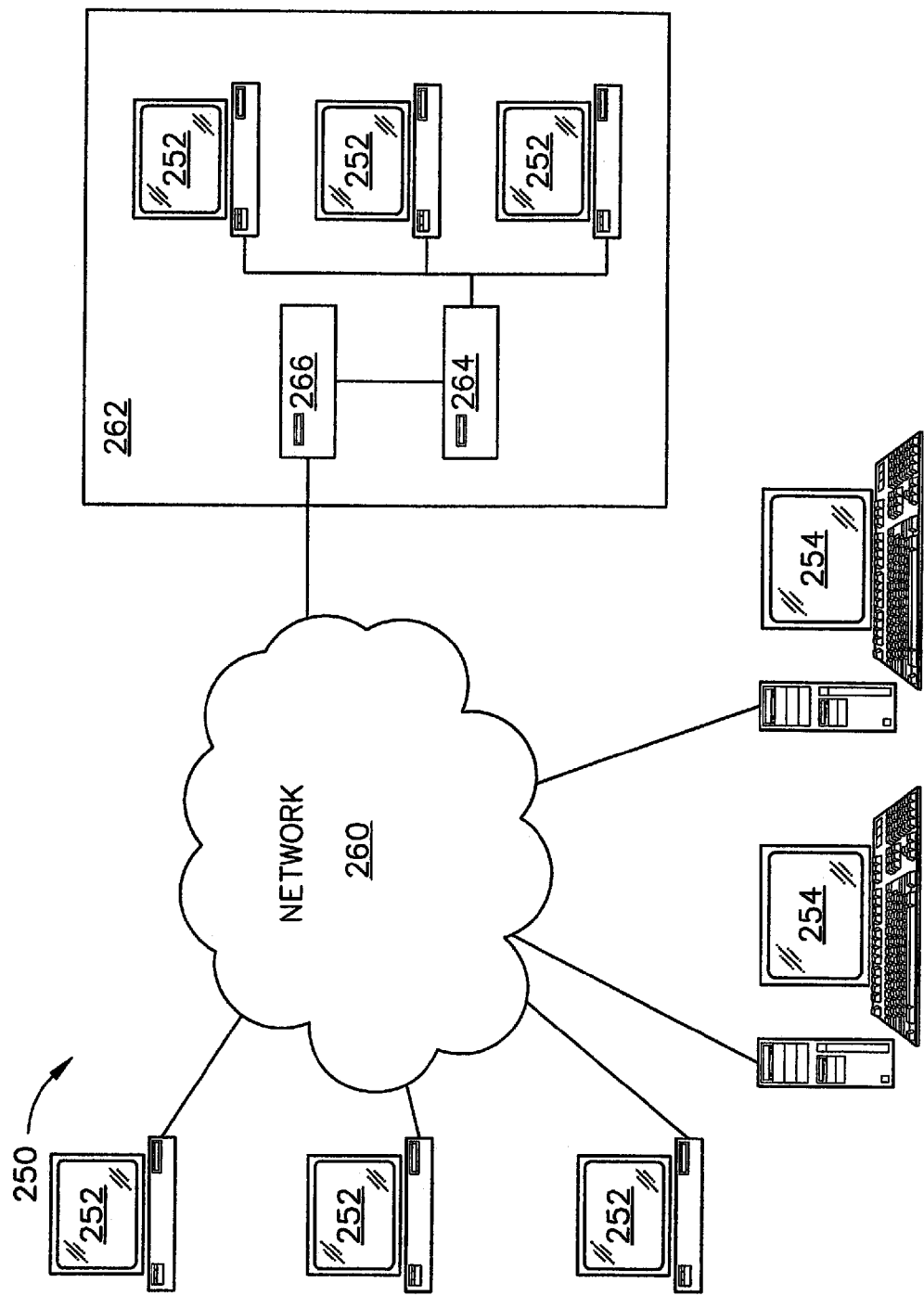
FIG. 12 shows a network of the invention for providing a data stream.

FIG. 12 shows a network for providing a syndicated data stream such as an RSS stream (short for Really Simple Syndication, RDF (Resource Description Framework) Site Summary or Rich Site Summary). RSS is an XML format for syndicating Web content. A Web site operator that wants to allow other sites to publish some of the Web site's content may create an RSS document and register the document with an RSS publisher. The published or "syndicated" content can then be presented on a different site, or through an aggregator or other system, directly at a client device. Syndicated content may include such data as news feeds, events listings, news stories, headlines, project updates, and excerpts from discussion forums or even corporate information. While RSS content often includes text, other data may also be syndicated, typically in binary form, such as images, audio, and so forth. The systems described herein may use all such forms of data source feed. In one embodiment, the XML/RSS feed itself may be converted to binary in order to conserve communications bandwidth. This may employ, for example, Microsoft's DINE specification for binary information, or any other suitable binary format.

As shown in FIG. 12, a network 250 may include a plurality of clients 252 and servers 254 connected via an internetwork 260. Any number of clients 252 and servers 254 may participate in such a network 250. The system may further include one or more local area networks ("LAN") 262 interconnecting clients 252 through a hub 264 (in, for example, a peer network such as a wired or wireless Ethernet network) or a local area network server 264 (in, for example, a client-server network). The LAN 262 may be connected to the internetwork 260 through a gateway 266, which provides security to the LAN 262 and ensures operating compatibility between the LAN 262 and the internetwork 260. Any data network may be used as the internetwork 260 and the LAN 262.

In one aspect of the systems described herein, a device within the internetwork 260 such as a router or, on an enterprise level, a gateway or other network edge or switching device, may cache popular data source feeds to reduce redundant traffic through the internetwork 260. In other network enhancements, clients 252 may be enlisted to coordinate sharing of data source feeds using techniques such as those employed in a BitTorrent peer-to-peer network. In the systems described herein, these and other techniques may be generally employed to improve performance of an RSS or other data source feed network.

In one embodiment, the internetwork 260 is the Internet, and the World Wide Web provides a system for interconnecting clients 252 and servers 254 in a communicating relationship through the Internet 260. The internetwork 260 may also, or instead, include a cable network, and at least one of the clients 252 may be a set-top box, cable-ready game console, or the like. The internetwork 260 may include other networks, such as satellite networks, the Public Switched-Telephone Network, WiFi networks, WiMax networks, cellular networks, and any other public, private, or dedicated networks that might be used to interconnect devices for transfer of data.

An exemplary client 252 may include a processor, a memory (e.g. RAM), a bus which couples the processor and the memory, a mass storage device (e.g. a magnetic hard disk or an optical storage disk) coupled to the processor and the memory through an I/O controller, and a network interface coupled to the processor and the memory, such as modem, digital subscriber line ("DSL") card, cable modem, network interface card, wireless network card, or other interface device capable of wired, fiber optic, or wireless data communications. One example of such a client 252 is a personal computer equipped with an operating system such as Microsoft Windows XP™, UNIX™, or Linux™, along with software support for Internet communication protocols. The personal computer may also include a browser program application, such as Microsoft Internet Explorer™, FireFox™, Google™ Chrome™, or Safari™, to provide a user interface for access to the internetwork 260. Although the personal computer is a typical client 252, the client 252 may also be a workstation, mobile computer, Web phone, VOIP device, television set-top box, interactive kiosk, personal digital assistant, wireless electronic mail device, or other device capable of communicating over the Internet. As used herein, the term "client" is intended to refer to any of the above-described clients 252 or other client devices, and the term "browser" is intended to refer to any of the above browser programs or other software or firmware providing a user interface for navigating an internetwork 260 such as the Internet.

An exemplary server 254 includes a processor, a memory (e.g. RAM), a bus which couples the processor and the memory, a mass storage device (e.g. a magnetic or optical disk) coupled to the processor and the memory through an I/O controller, and a network interface coupled to the processor and the memory. Servers may be clustered together to handle more client traffic, and may include separate servers for different functions such as a database server, an application server, and a Web presentation server. Such servers may further include one or more mass storage devices such as a disk farm or a redundant array of independent disk ("RAID") system for additional storage and data integrity. Read-only devices, such as compact disk drives and digital versatile disk drives, may also be connected to the servers. Suitable servers and mass storage devices are manufactured by, for example, IBM™, and Sun Microsystems™. Generally, a server 254 may operate as a source of content and provide any associated back-end processing, while a client 252 is a consumer of content provided by the server 254. However, it should be appreciated that many of the devices described above may be configured to respond to remote requests, thus operating as a server, and the devices described as servers 254 may operate as clients of remote data sources. In contemporary peer-to-peer networks and environments such as RSS environments, the distinction between clients and servers blurs. Accordingly, as used herein, the term "server" is generally intended to refer to any of the above-described servers 254, or any other device that may be used to provide content, such as RSS feeds, in a networked environment.

Focusing now on the internetwork 260, one embodiment is the Internet. The structure of the Internet is well known to those of ordinary skill in the art and includes a network backbone with networks branching from the backbone. These branches, in turn, have networks branching from them, and so on. The backbone and branches are connected by routers, bridges, switches, and other switching elements that operate to direct data through the internetwork 260. However, one may practice the present invention on a wide variety of communication networks. For example, the internetwork 260 can include interactive television networks, telephone networks, wireless voice or data transmission systems, two-way cable systems, customized computer networks, Asynchronous Transfer Mode networks, and so on. Clients 252 may access the internetwork 260 through an Internet Service Provider ("ISP", not shown) or through a dedicated DSL service, ISDN leased lines, T1 lines, OC3 lines, digital satellite service, cable modem service, or any other connection, or through an ISP providing same.

The internetwork 260 may include a worldwide computer network that communicates using the well-defined Transmission Control Protocol ("TCP") and Internet Protocol ("IP") to provide transport and network services. Computer systems that are directly connected to the Internet 260 each have a unique IP address. To simplify Internet addressing, the Domain Name System ("DNS") was created. The DNS allows users to access Internet resources with a simpler alphanumeric naming system. A DNS name consists of a series of alphanumeric names separated by periods. When a domain name is used, the computer accesses a DNS server to obtain the explicit four-byte, IP address. It will be appreciated that other internetwork may be used with the invention. For example, the internetwork 260 may be a wide-area network, a local area network, a campus area network, or corporate area network. The internetwork 260 may be any other network used to communicate data, such as a cable broadcast network.

To further define the resources on the internetwork 260 the Uniform Resource Locator system was created. A Uniform Resource Locator ("URL") is a descriptor that specifically defines a type of Internet resource along with its location. URLs have the following format: resource-type://domain.address/path-name.

"Resource-Type" defines the type of Internet resource. Web documents are identified by the resource type "http" which indicates that the hypertext transfer protocol should be used to access the document. Other common resource types include "ftp" (file transmission protocol), "mailto" (send electronic mail), "file" (local file), and "telnet." The domain-.address defines the domain name address of the computer that the resource is located on. Finally, the path-name defines a directory path within the file system of the server that identifies the resource. As used herein, the term "IP address" is intended to refer to the four-byte Internet Protocol address, and the term "Web address" is intended to refer to a domain name address, along with any resource identifier and path name appropriate to identify a particular Web resource. The term "address," when used alone, may refer to either a Web address or an IP address.

In an exemplary embodiment, a browser, executing on one of the clients 252, retrieves a Web document at an address from one of the servers 254 via the internetwork 260, and displays the Web document on a viewing device, e.g., a screen. A user can retrieve and view the Web document by entering, or selecting a link to, a URL in the browser. The browser then sends an http request to the server 254 that has the Web document associated with the URL. The server 254 responds to the http request by sending the requested Web document to the client 252. The Web document is an HTTP object that includes plain text (ASCII) conforming to the HyperText Markup Language ("HTML"). Other markup languages are known and may be used on appropriately enabled browsers and servers, including the Dynamic HyperText Markup Language ("DHTML"), the Extensible Markup Language ("XML"), the Extensible Hypertext Markup Language ("XHML"), and the Standard Generalized Markup Language ("SGML").

Each Web document usually contains hyperlinks to other Web documents. The browser displays the Web document on the screen for the user and the hyperlinks to other Web documents are emphasized in some fashion such that the user can identify and select each hyperlink. To enhance functionality, a server 254 may execute programs associated with Web documents using programming or scripting languages, such as Perl, C, C++, C#, or Java, or a Common Gateway Interface ("CGI") script to access applications on the server. A server 254 may also use server-side scripting languages such as ColdFusion from MacroMedia or PHP. These programs and languages may perform "back-end" functions such as order processing, database management, and content searching. A Web document may also contain, or include references to, small client-side applications, or applets, that are transferred from the server 254 to the client 252 along with a Web document and executed locally by the client 252. Java is one popular example of a programming language used for applets. The text within a Web document may further include (non-displayed) scripts that are executable by an appropriately enabled browser, using a scripting language such as JavaScript or Visual Basic Script. Browsers may further be enhanced with a variety of helper applications to interpret various media including still image formats such as JPEG and GIF, document formats such as PS and PDF, motion picture formats such as AVI and MPEG, animated media such as Flash media, and sound formats such as MP3 and MIDI. These media formats, along with a growing variety of proprietary media formats, may be used to enrich a user's interactive and audio-visual experience as each Web document is presented through the browser. The term "page" as used herein is intended to refer to the Web document described above, as well as any of the above-described functional or multimedia content associated with the Web document, In general operation, a server 254 may provide a data stream to a client 252. In an exemplary embodiment, the data stream may be a syndicated data stream such as RSS or an XML grammar for sharing data through the Web. An RSS-enabled server may include an RSS file with a title and description of items to be syndicated. As with simple HTML documents, the RSS file may be hand-coded or computer-generated.

Figure 13:
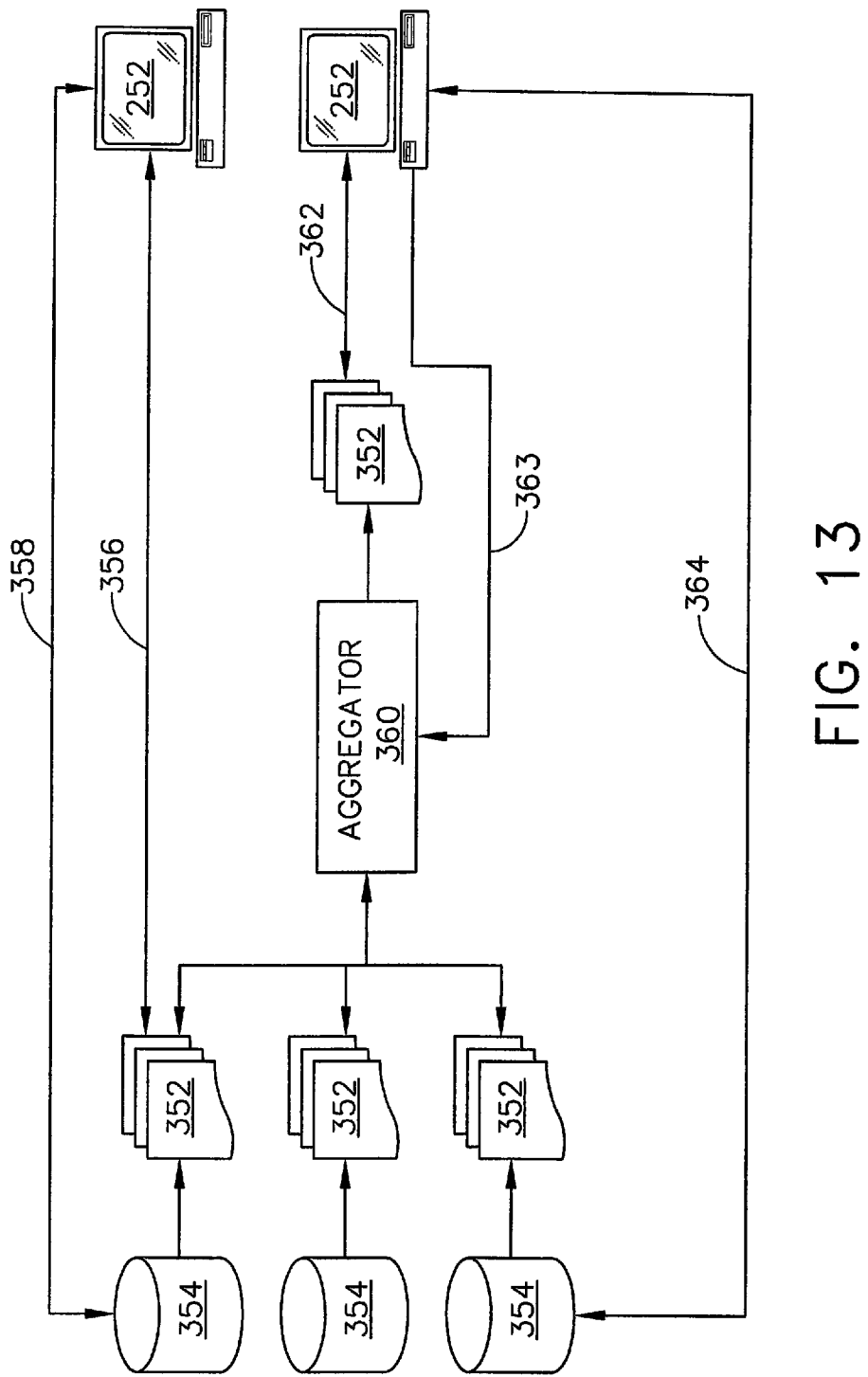
FIG. 13 shows a system for aggregating data source feeds of the invention.

FIG. 13 depicts a system for using and aggregating data source feeds or other syndicated content. In general, data source feeds 352, such as RSS source files, are generated from a content source 354 and made available for use or review by clients 252 through a network.

The content source 354 may provide any electronic content including newspaper articles, Web magazine articles, academic papers, government documents such as court opinions, administrative rulings, regulation updates, or the like, opinions, editorials, product reviews, movie reviews, financial or market analysis, current events, bulletins, and the like. The content may include text, formatting, layout, graphics, audio files, image files, movie files, word processing files, spreadsheet files, presentation files, electronic documents, HTML files, executable files, scripts, multi-media, relational databases, data from relational databases and/or any other content type or combination of types suitable for syndication through a network. The content source 354 may be any commercial media provider(s) such as a newspapers, news services (e.g., Reuters or Bloomberg), or individual journalists such as syndicated columnists. The content source 354 may also be from commercial entities such as corporations, non-profit corporations, charities, religious organizations, social organizations, or the like, as well as from individuals with no affiliation to any of the foregoing. The content source 354 may be edited, as with news items, or automated, as with data source feeds 352 such as stock tickers, sports scores, weather conditions, and so on. While written text is commonly used in data source feeds 352, it will be appreciated that any digital media may be binary encoded and included in an item of a data source feed 352 such as RSS. For example, data source feeds 352 may include audio, moving pictures, still pictures, executable files, application-specific files (e.g., word processing documents or. spreadsheets), and the like. It should also be understood that, while a content source 354 may generally be understood as a well defined source of items for a data source feed, the content source 354 may be more widely distributed, or subjectively gathered by a user preparing a data source feed 352. For example, an individual user interested in automotive mechanics may regularly read a number of related magazines and regularly attend trade shows. This information may be processed on an ad hoc basis by the individual and placed into a data source feed 352 for review and use by others. Thus it will be understood that the data stream systems described herein may have broad commercial use, as well as non-commercial, educational, and mixed uses.

As described generally above, the data source feed 352 may include, for each item of content, summary information such as a title, synopsis or abstract (or a teaser, for more marketing oriented materials), and a link to the underlying content. Thus as depicted in FIG. 13, when a client 252 accesses a data source feed 352, as depicted by an arrow 356, the client 252 may then display the summary information for each item in a user interface. A client 252 may, in response to user input such as clicking on a title of an item in the user interface, retrieve the underlying item from the content source 354 as indicated by an arrow 358. In the bi-directional communication depicted by the arrow 358, the client 252 may also identify the specific data source feed 352 through which the item was identified, which may be useful for tracking distribution channels, customer behavior, affiliate referral fees, and so forth. It should be appreciated that an RSS data source feed 352 may be presented to a client 252 as an RSS file (in XML format) that the client 252 locally converts to HTML for viewing through a Web browser, or the data source feed 352 may be converted to HTML at a Web site that responds to HTTP requests from a client 252 and responds with an HTML-formatted data source feed.

A related concept is the so-called "permalink" that provides a permanent URL reference to a source document that may be provided from, for example, a dynamically generated Web site, or a document repository served from a relational database behind a Web server. While there is no official standard for permalink syntax or usage, they are widely used in conjunction with data source feeds. Permalinks typically consist of a string of characters which represent the date and time of posting, and some (system dependent) identifier (which includes a base URL, and often identifies the author, subscriber, or department which initially authored the item). If an item is changed, renamed, or moved, its permalink remains unaltered. If an item is deleted altogether, its permalink cannot be reused. Permalinks are exploited in a number of applications including link tracing and link track back in Weblogs, and references to specific Weblog entries in RSS or Atom syndication streams. Permalinks are supported in most modern weblogging and content syndication software systems, including Movable Type, LiveJournal, and Blogger.

RSS provides a standard format for the delivery of content through data source feeds. This makes it relatively straightforward for a content provider to distribute content broadly, and for an affiliate to receive and process content from multiple sources. It will be appreciated that other RSS-compliant and/or non-RSS-compliant source feeds may be syndicated as that term is used herein, and as described in greater detail below. As noted above, the actual content may not be distributed directly, only the headline, which means that users will ultimately access the content source 354 if they're interested in a story. It is also possible to distribute the item of content directly through RSS, though this approach may compromise some of the advantages of network efficiency (items are not copied and distributed in their entirety) and referral tracking. Traffic to a Web site that hosts a content source 354 can increase in response to distribution of data source feeds 352.

Although not depicted, a single content source 354 may also have multiple data source feeds 352. These may be organized topically, or according to clients 252. Thus, the same content may have data source feeds 352 for electronic mailing lists, PDAs, cell phones, and set-top boxes. For example, a content provider may decide to offer headlines in a PDA-friendly format, or create a weekly email newsletter describing what's new on a Web site.

Data source feeds 352 in a standard format provide for significant flexibility in how content is organized and distributed. An aggregator 360, for example, may be provided that periodically updates data from a plurality of data source feeds 352. In general, an aggregator 360 may make many data source feeds 352 available as a single source. As a significant advantage, this intermediate point in the content distribution chain may also be used to customize source feeds and presentation thereof, as well as to filter items within source feeds and provide any other administrative services to assist with syndication, distribution, and review of content.

The aggregator 360 may filter, prioritize or otherwise process the aggregated data source feeds. A single processed data source feed 352 may then be provided to a client 252 as depicted by an arrow 362. The client 252 may request periodic updates from the data source feed 352 created by the aggregator 360, as also indicated by an arrow 362. As indicated by an arrow 363, the client 252 may also configure the aggregator 360 such as by adding data streams 352, removing data streams 352, searching for new data streams 352, explicitly filtering or prioritizing items from the data streams 352, or designating personal preferences or profile data that the aggregator 360 may apply to generate the aggregated data source feed 352. When an item of interest is presented in the user interface of the client 252, a user may select a link to the item causing the client 252 to retrieve the item from the associated content source 354, as indicated by an arrow 364. The aggregator 360 may present the data source feed 352 as a static web page that is updated only upon an explicit request from the client 252, or the aggregator 360 may push updates to a client 252 using either HTTP or related Web browser technologies, or by updates through some other channel, such as e-mail updates. While the aggregator 360 is illustrated as separate from the client 252, the aggregator 360 may be realized as a primarily client-side technology, where software executing on the client 252 assumes responsibility for directly accessing a number of data source feeds 352 and aggregating/filtering results from those source feeds 352.

A user search for source feeds can be improved by the availability of well organized databases. While a number of Weblogs provide local search functionality, and a number of aggregator services provide lists of available data source feeds, there remains a need for a consumer-level searchable database of source feed content. As such, one aspect of the system described herein is a database of data source feeds that is searchable by contents as well as metadata such as title and description. In a server used with the systems described herein, the entire universe of known data source feeds may be hashed or otherwise organized into searchable form in real time or near real time. The hash index may include each word or other symbol and any data necessary to locate it in a stream and in a post.

The advent of commonly available data source feeds 352, such as RSS source feeds, along with tools such as aggregators 360, enables new modes of communication. In one common use, a user may, through a client 252, post aggregated source feeds 352 to a Weblog. The information posted on a Weblog may include an aggregated source feed 352, one or more data source feeds 352 that are sources for the aggregated source feed 352, and any personal, political, technical, or editorial comments that are significant to the author. As such, all participants in an RSS network may become authors, sources and evaluators of content, as well as consumers.

Figure 1A:
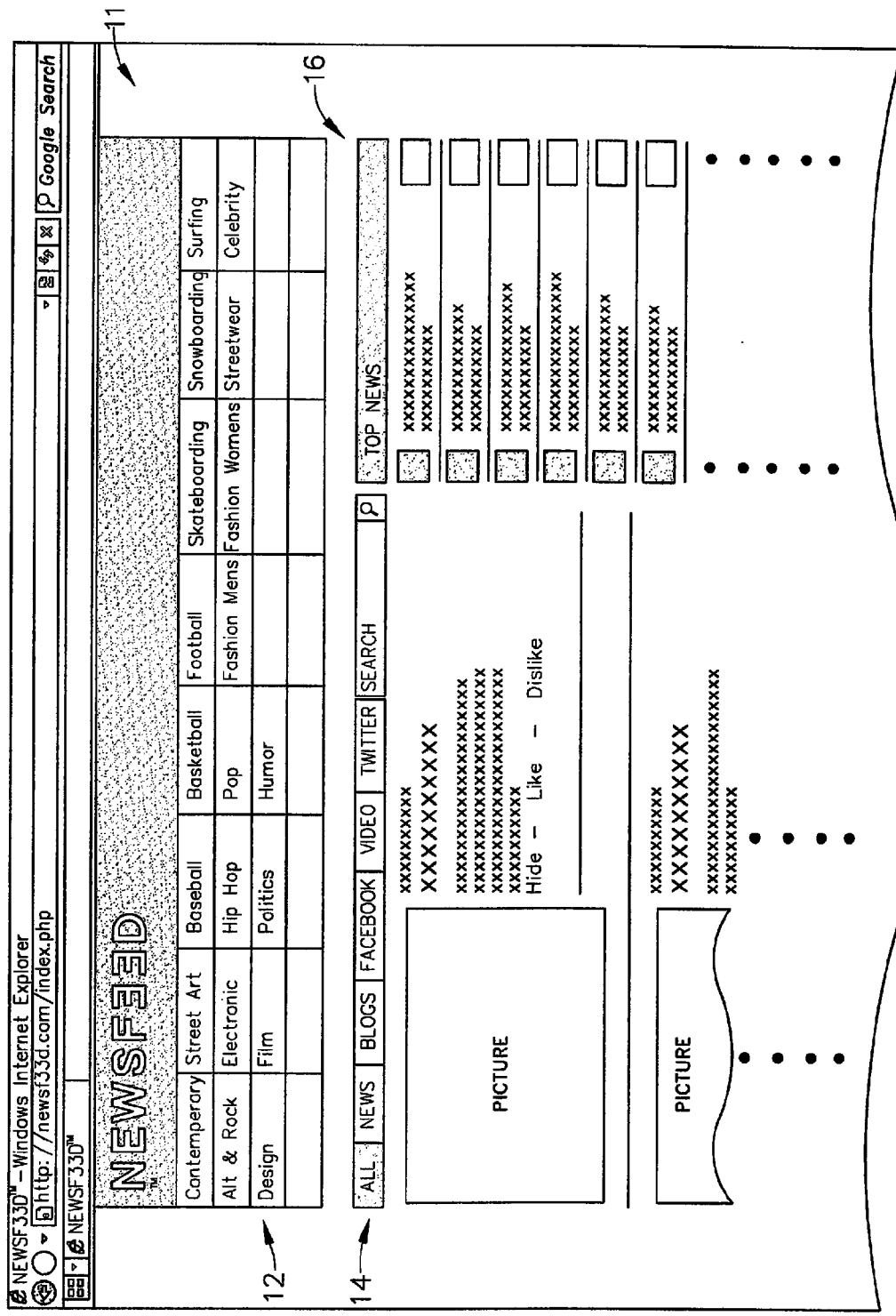
FIG. 1A is a representative graphical screen display of the invention.

FIG. 1A shows a webpage 11 of one embodiment of a News Feed, which may also be referred to as a graphical news feed. A user could utilize this page as a home page. The webpage shows a subject matter channel list 12 and a category list 14. The subject matter channel list 12 can be color coded so that when a category is selected, the color associated with that category flows through to other title blocking, such as "Top News" 16 and the category list 14. In addition to the "Top News" menu, there may also be a "Top Channels" menu, a "Featured Channels" menu, or other menus available to a user. The user operation of this embodiment will be described here, and the backend or administrative operation of the various functions will be described later. While this embodiment is described as an application for a traditional computer, it could also be used as a mobile application for a smart phone.

Figure 1B:
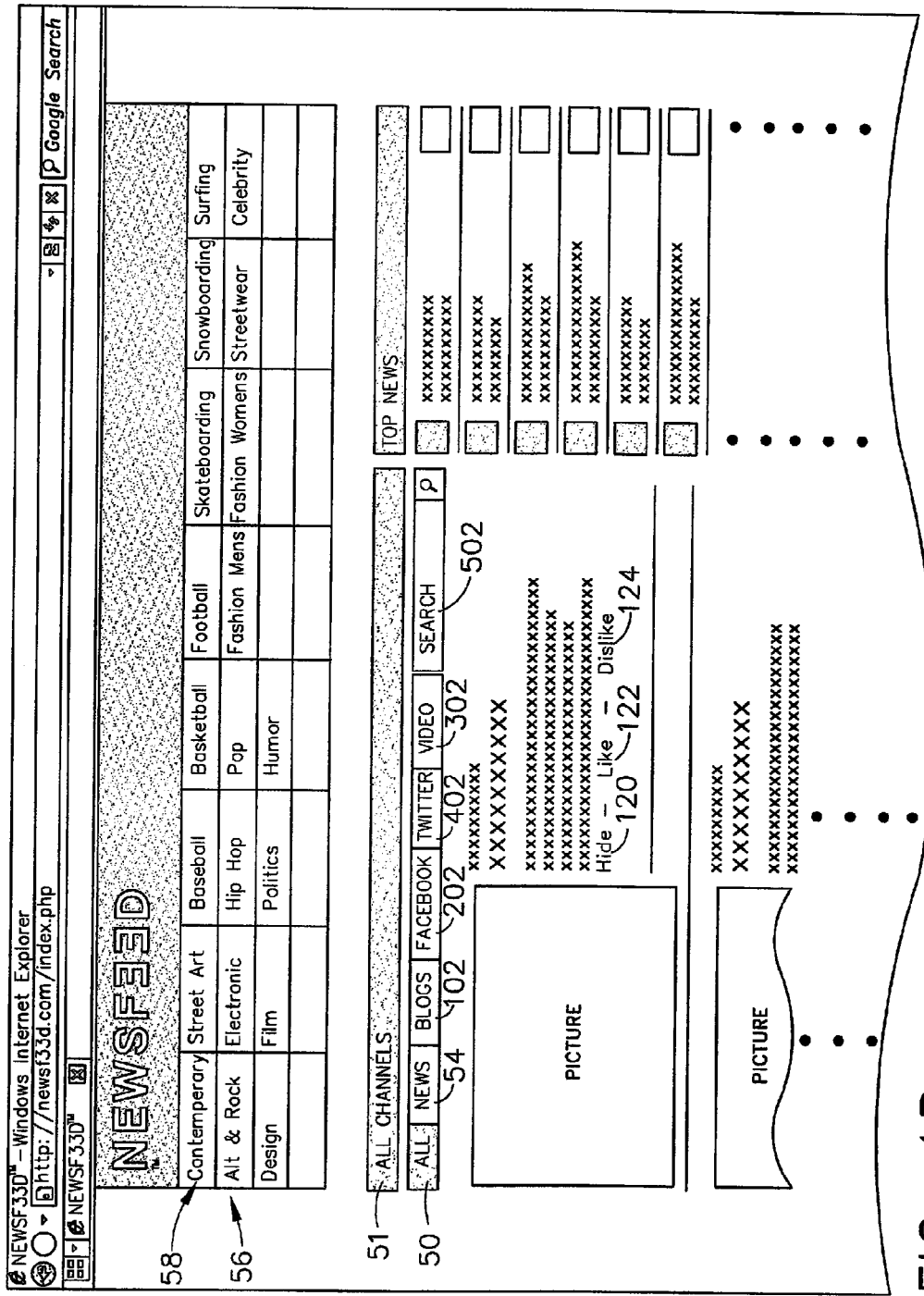
FIG. 1B is another representative graphical screen display of the invention.

FIG. 1B shows an exemplar of another embodiment of a graphical news feed. The user receives the broadest information by selecting the "All" categories bar 50 while in the "All" channels homepage, as indicated by the bar 51. The user can narrow the articles displayed by selecting one of the channels from the channels bar 56. By selecting one channel, such as "Contemporary Art," 58 the user will be provided only articles relating to Contemporary Art. The user may also create an individual profile. The individual profile may contain the user's interests, schools attended, area of work, hobbies, friends, age, or other profile information about the user. The website can use the profile information to individualize other links and information presented on the user's individualized webpage, such as "Top News" and "Top Channels."

The user can further narrow the provided materials by selecting All 50, News 54, Blogs 102, Facebook™ 202, video 302, or Twitter™ 402 categories with the appropriate button. Or, the user may conduct a search by selecting the search button 502. Each of the category sections is coordinated to certain types of data source feeds. For example, the news feed section may contain data sources from magazines, forums, online publications, Associated Press™, CNN™, Reuters™, Fox News™, newspapers, and other news related publications. The blog section contains data sources from internet blogs specified in the data source feeds. The Facebook™ button will invoke source feeds from Facebook™ pages, whether personal, commercial, or organizational, specified in the data source feeds. The Video feed button will invoke source feeds from preselected video sites, such as You Tube and others specified in the data source feeds. The video feed button may also draw video from other data sources, such as blogs, Facebook™, news, or Twitter™ sites. The Twitter™ feed button invokes source feeds from Twitter™ sources specified in the data source feeds.

When the user selects a specific category, articles related to the category are graphically displayed on the user's screen. While the other source feeds operate similarly, a user operating in the news feed environment will be described here. By selecting the news feed button, the user is presented with graphical displays of the various news feed articles. The specific news feed articles the user will see are based on the database of selected news sources, channels, and keywords. For example, a source checking archive algorithm will search selected news sources for articles containing keywords included in the keyword database. Upon matching the selected news sources and keywords, the article is stored in an archive database. When a user selects the data source feed, those source articles stored in the archive database are graphically displayed on the user's screen.

The news feed algorithm could also contain its own proprietary search engine which does not rely on RSS source feeds to feed data. The search engine may actively search for information to include in the news feed site. Alternatively, a commercialized search engine such Google™ could be used as a search engine. The search engine could search only articles stored in archives 634 (FIG. 19) or it could search the web.

The searching function may be performed continuously, or it may be performed every predetermined amount of time. When the search function is performed continuously, then the news feeds or other feeds can be provided to the user in real time. The search function may be a search of the articles stored in the archive, a broad web search, or a keyword search described later.

The article may be displayed in its entirety, by title, as an abstract, or in any combination thereof. Additionally, a picture related to the article may also be displayed with the text. The picture may be from the article, or it may be a picture selected from a stock selection of pictures or from a search for pictures related to the subject matter of the article. The display may also include relevant data related to the article, such as date, time, the keyword associated with the article and the article source.

Figure 2:
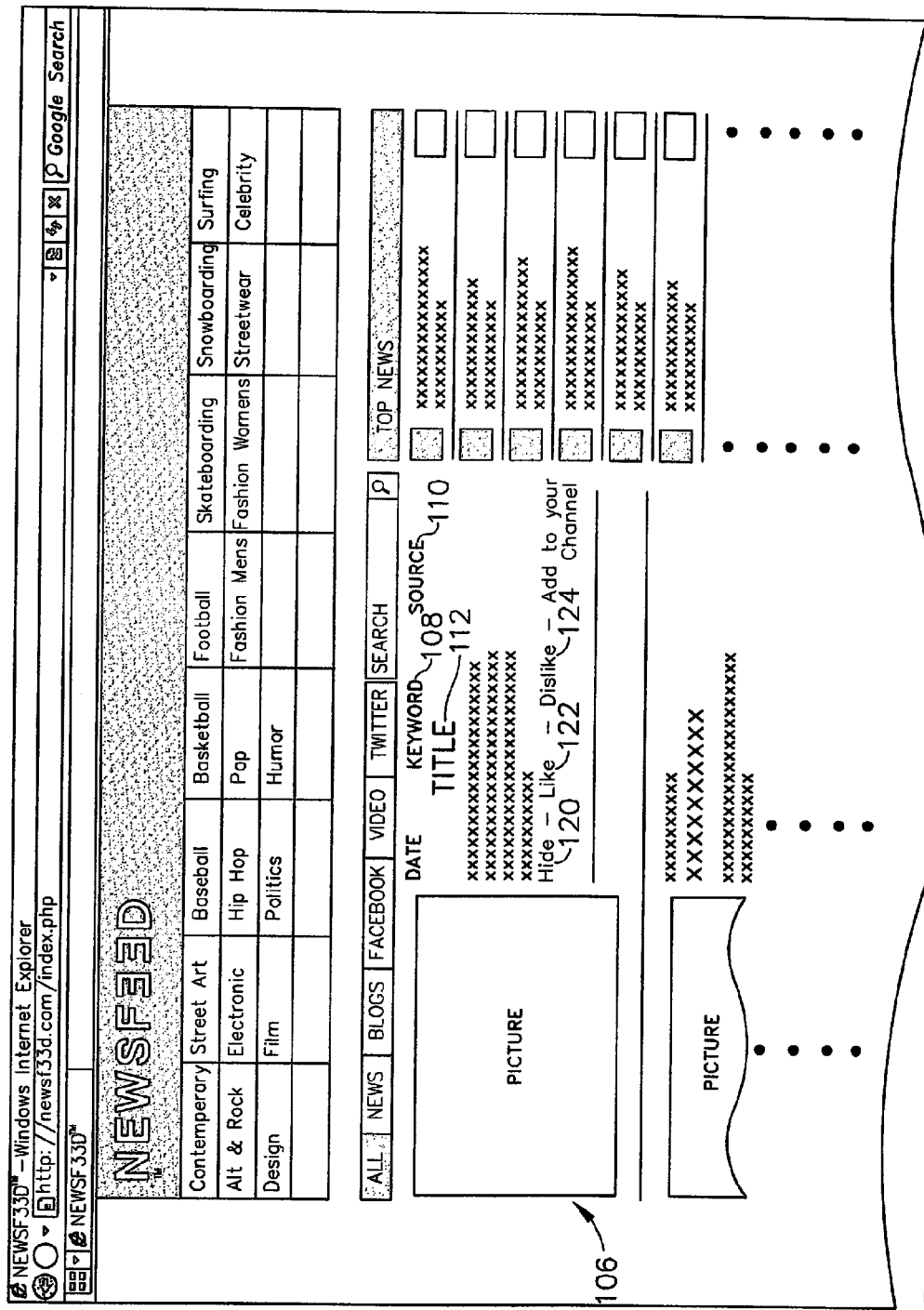
FIG. 2 is another representative graphical screen display of the invention.
Figure 3:
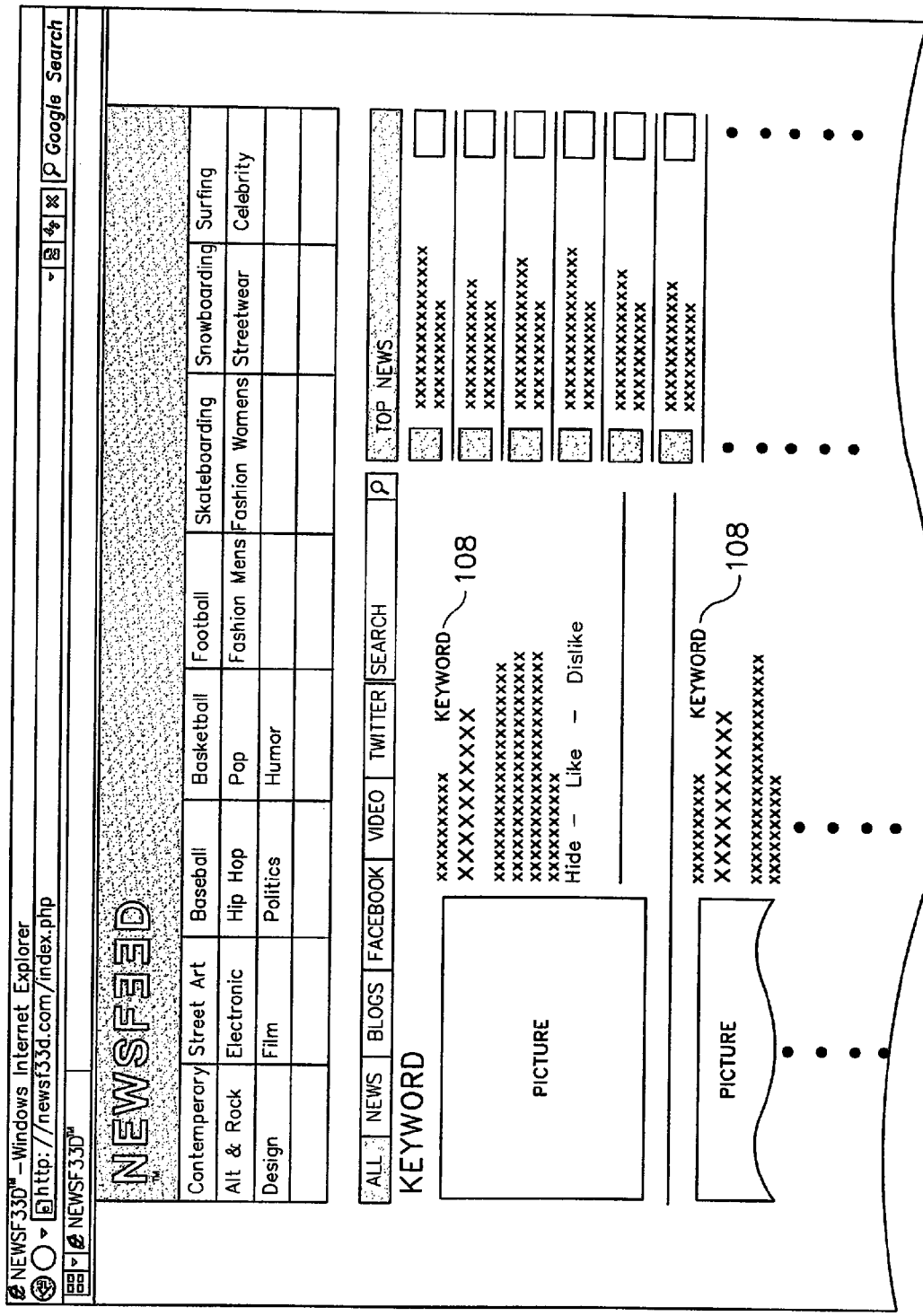
FIG. 3 is a representative graphical screen display of the invention showing articles relating to a keyword.

As shown in FIG. 2, the snapshot of the article may also include buttons allowing the user to perform various functions related to the article. By clicking on the relevant data displayed such as article keyword and source, the user may be hyperlinked to additional information related to the article keyword and source. For example, the article in the news feed snapshot of an article 106 includes a keyword 108, title 112, and content provider source 110. By clicking on the keyword 108, the user is brought to a multitude of snapshots of articles that include the keyword, as shown in FIG. 3. The source of those articles may be from the primary source, from multiple data sources included in the database, or from any available sources on the web, or from any combination thereof.

Figure 4:
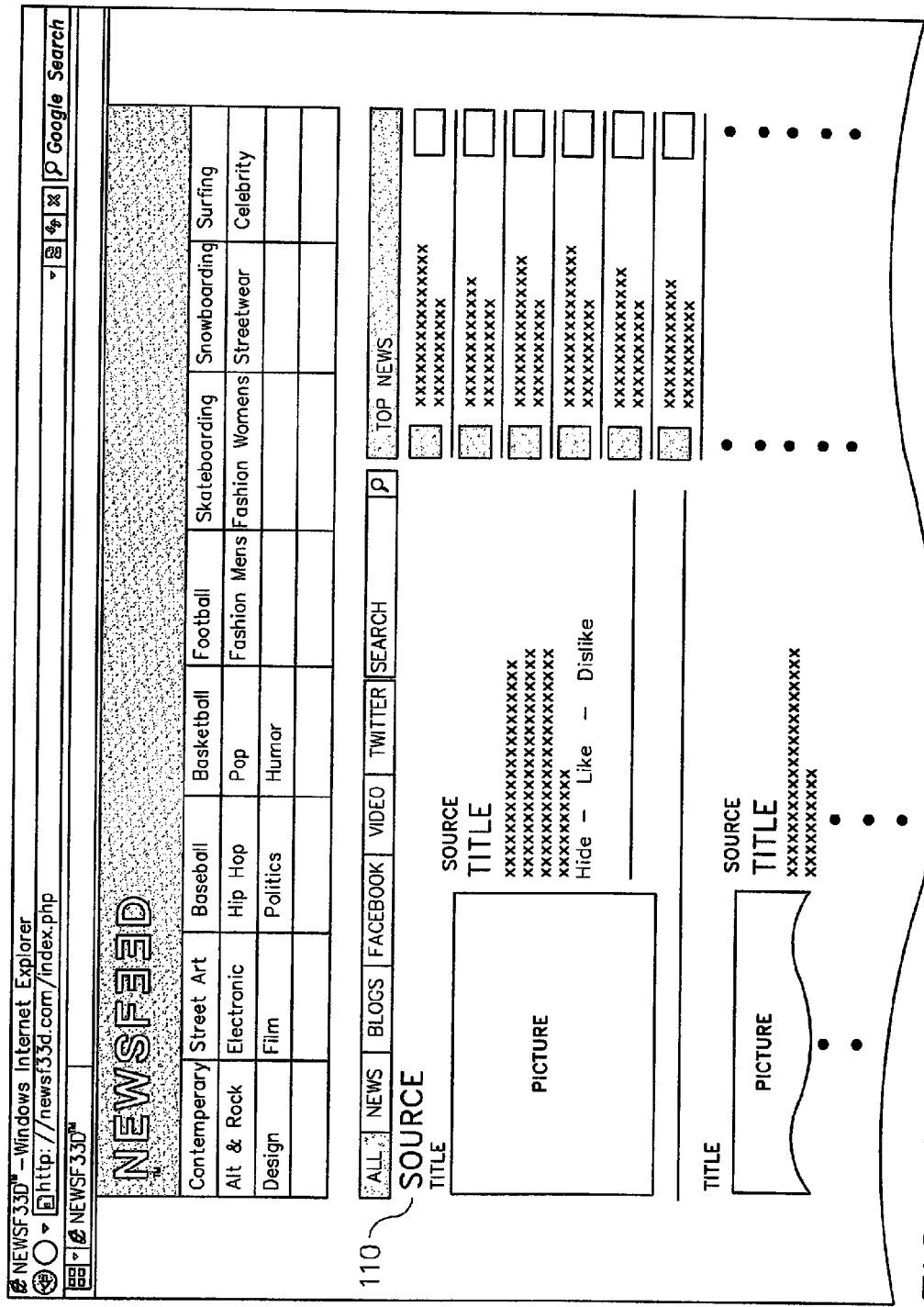
FIG. 4 is a representative graphical screen display of the invention showing articles relating to a feed source.

Referring back to FIG. 2, by clicking on the source, the user is shown a multitude of articles from the content provider source 110, whether or not those articles include the keyword. As shown in FIG. 4, the articles displayed when a user clicks on the source may include only those articles including other keywords in the database, or they may include all articles in the content provider source 110.

Figure 5:
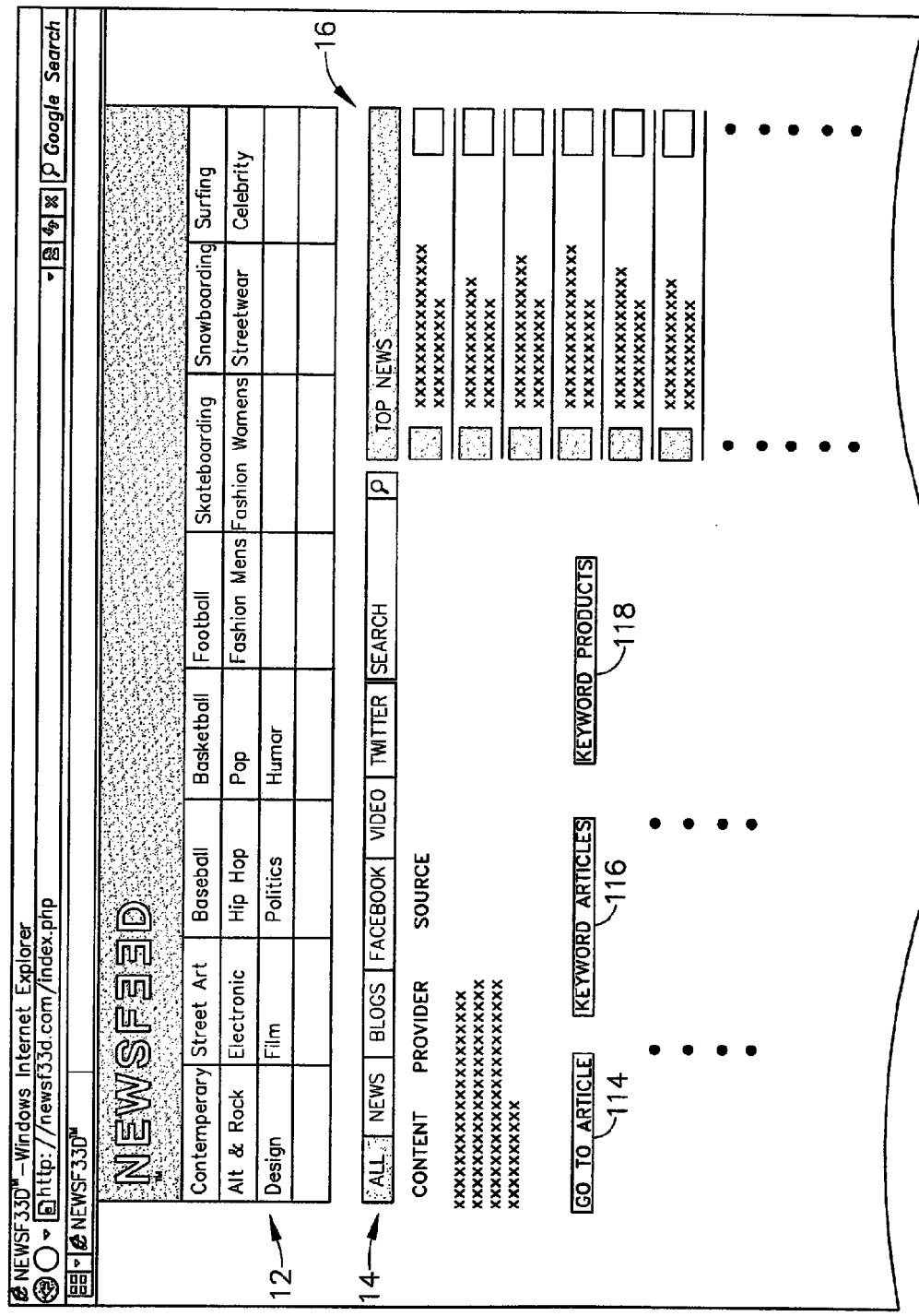
FIG. 5 is a representative graphical screen display of the invention showing additional user options relating to an article.

A link to the entire article may also be displayed, allowing the user to view the full text of the article by clicking on the title of the article or on the picture associated with the article. Additionally, as shown in FIG. 5, clicking on the article may reveal other options for the user, including opening the full article 114, locating all articles related to the keyword 116, viewing the entire source feed from which the article came, or other such options such as products related to the keyword 118.

As shown in FIG. 2, the snapshot may also include buttons such as "hide" 120, "like" 122, and "dislike" 124. By using the hide button, the user may hide the specific article, may hide keywords related to the article, or may hide the provider source from the user's feed. The like button may allow the user to mark the article as "like", and the search engine may note that the user likes similar articles and weigh them higher on the user's listing in the future. Additionally, the like button may bring the user to an additional screen where the user can select the specifics of why the user likes the article, such as the author, keyword, or data source. By selecting the specific "like", the searcher may find additional related articles for the user or may place that "like" higher in the hierarchy of search terms for the user. Similarly, the user may select the dislike button. The dislike button may hide the snapshot, or it may bring the user to an additional screen where the user can select the specifics of why the user dislikes the article, such as the author, keyword, or data source. By selecting the specific reason for the "dislike", the searcher may filter out related article in the future from the user's display.

The like and dislike buttons may also be coupled to a scoring system to determine which stories will be included in the "Top News" section 16 (FIG. 1A). Various scoring systems could be used. One scoring system would add points to the article score each time a user clicks the "like" button and would deduct points from the article score each time a user clicks the "dislike" button. Points may also be added when the article is viewed by a user. Other criteria for adding and deduction points may also be used. The score can be kept as a running total or can be restarted after a predetermined interim of time, such as a day, a week, or a month.

Other categories of source feeds, such as blogs, Facebook™, Video, and Twitter™ operate similarly to the News Feed category.

The source feeds that are transmitted to the user typically are filtered. Examples of filters that may be used include data source filters, subject matter filters, and keyword filters. The filters limit the amount of data transmitted to the user to the most relevant data as determined by the filters. For example, by defining the data sources, the source feed can exclude sources such as Ebay™, Craigslist™, and other such data sources that a user may not typically find relevant.

Figure 8A:
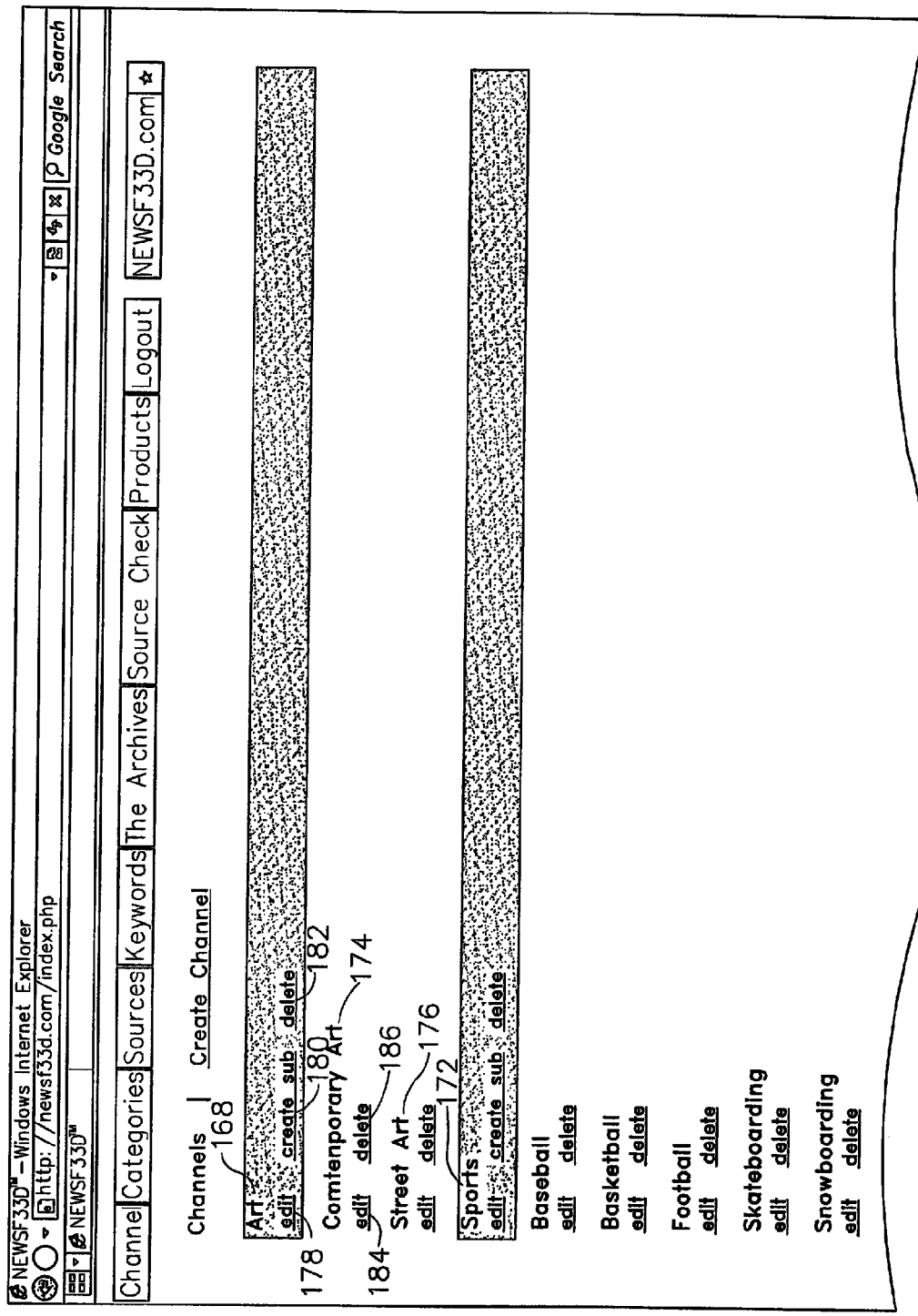
FIG. 8A is a representative administrator's graphical screen display of the invention showing subject matter channels.

The archives database, which contains articles that meet certain keyword and source criteria and are described later, are associated with channels. Additionally, when the administrator enters or edits a source or keyword, that source or keyword is associated with at least one subject matter channel. FIG. 8A shows a sample of the subject matter channels that may be used. Two channels, Art 168, and Sports 172, are shown in the FIG. 8A exemplar. Each of the channels may also have subcategories. For example, the Art channel also has the subchannels of "Contemporary Art" 174 and "Street Art" 176. The administrator may use the appropriate buttons to edit channels 178, create subchannels 180, or delete channels 182. Also, the administrator may use the buttons to edit 184 or delete 186 subchannels. The list of subject matter channels is received and stored in a database. The new subject matter channel or edits to an existing subject matter channel are then stored in the database.

Figure 8B:
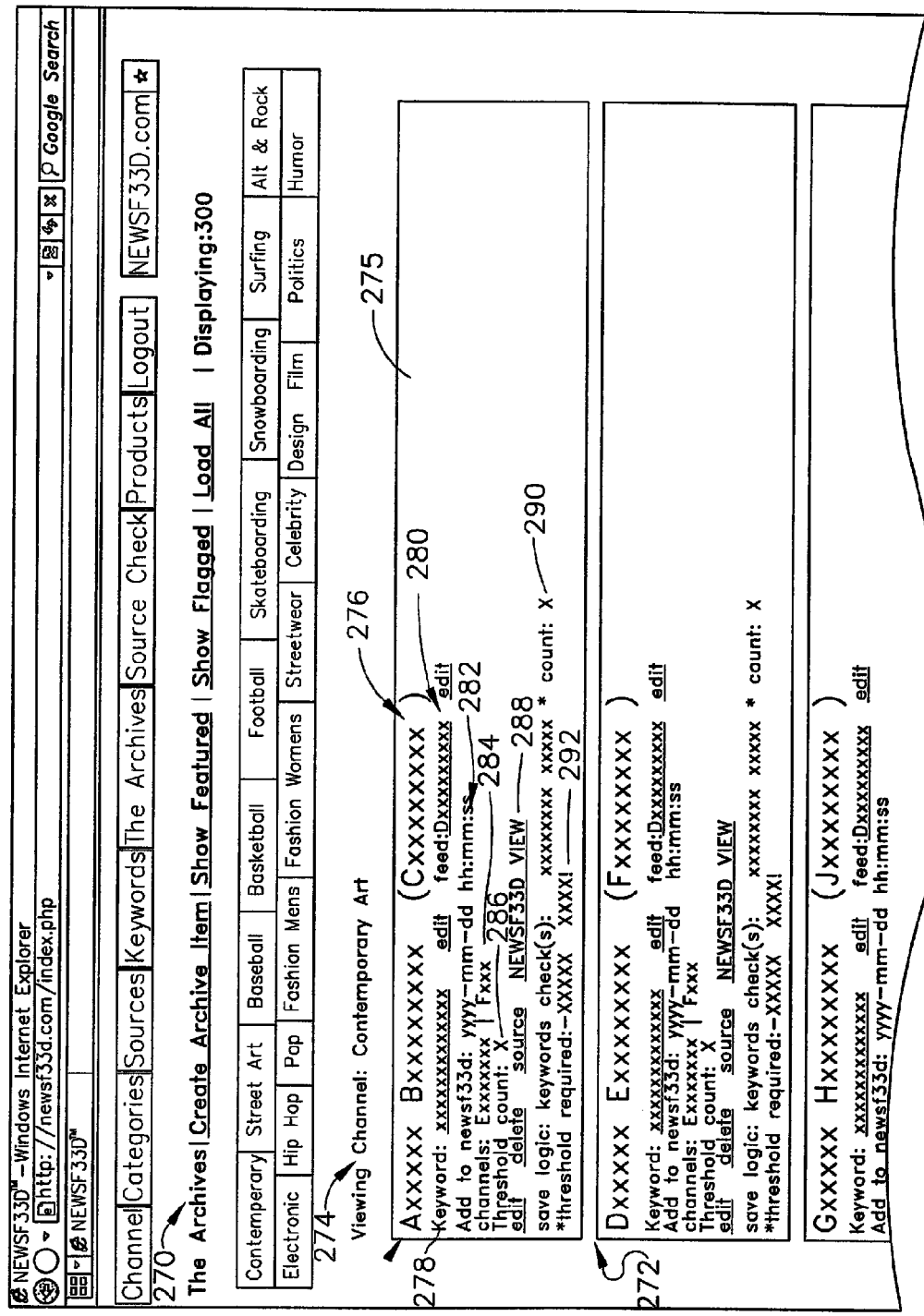
FIG. 8B is a representative administrator's graphical screen display of the invention showing archives.

FIG. 8B depicts the archives 270 and how the articles 272 are categorized by channel 274. The display 275 includes the title 276 of the article, the keyword 278 that was found in the article, the source feed 280 from which the article came, the date 282 that the article was added to the archive, the channels 284, the threshold count 286 (which is the number of times the keyword must appear in the article before it is included in the archive), options for editing and deleting the article and viewing the source 288, the number of times the keyword was found in the article 290, and a confirmation that the threshold count was met 292. While a keyword may be used in multiple channels, if the feed source is directed to only one channel, then the article will only be displayed in that one channel.

Figure 6:
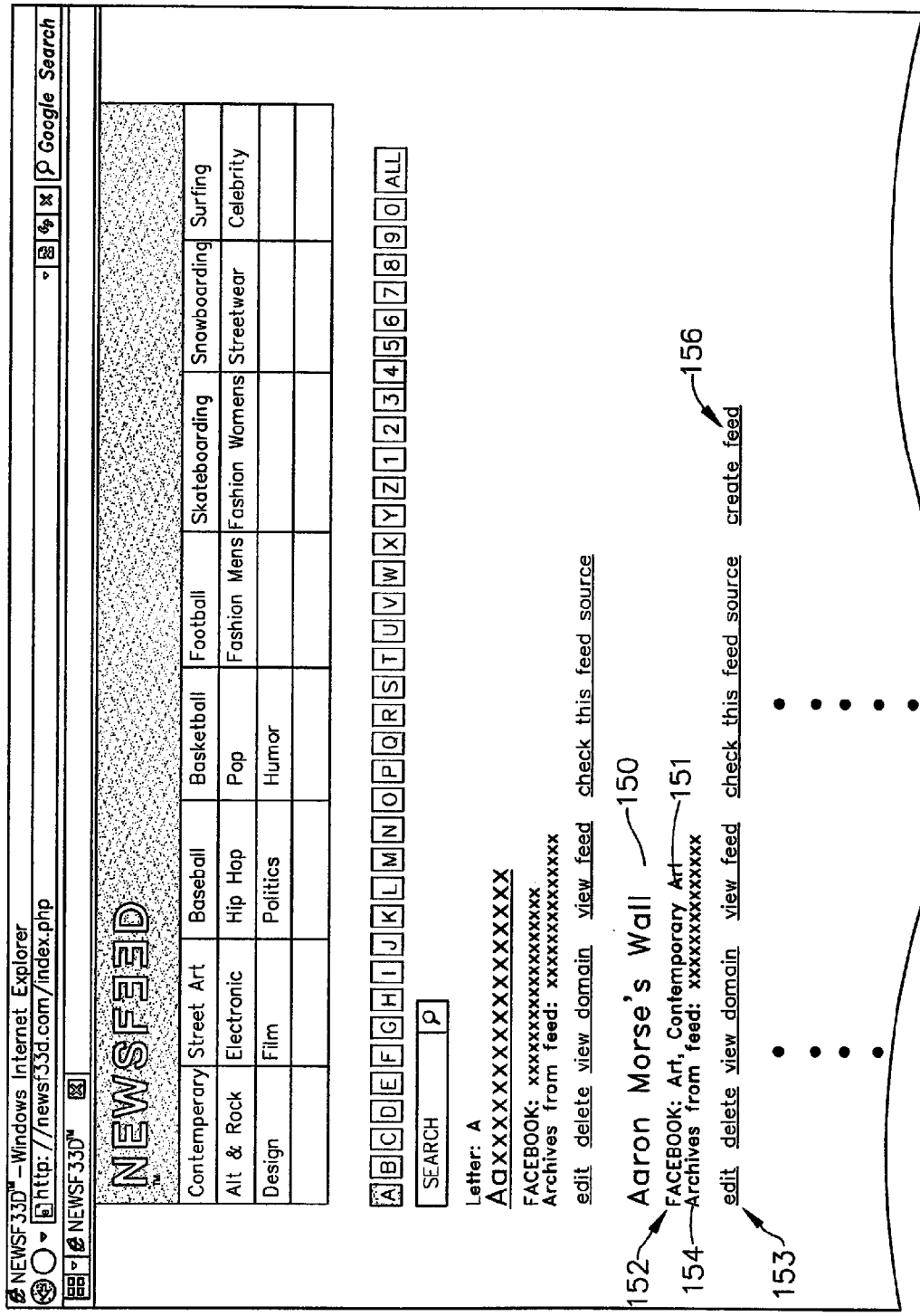
FIG. 6 is a representative administrator's graphical screen display of the invention showing various source feeds.

FIG. 6 shows a sample of feed filters that may be used as the data sources. While RSS source feeds are common, other types of source feeds in addition to RSS source feeds may also be utilized. Typically, the administrator would establish a primary list of the data sources. Each of the data sources has a title such as "Aaron Morse's Wall" 150, a source category 152 ("Facebook™"), and channel designations 151 ("Art", "Contemporary Art") and a running total of archives stored from the source feed 154. The administrator, using the edit, delete, view domain, view feed, and check this source feed 153, may modify or check the source attributes. The list of feed filters, or data sources, are received and stored in a database.

Figure 7:
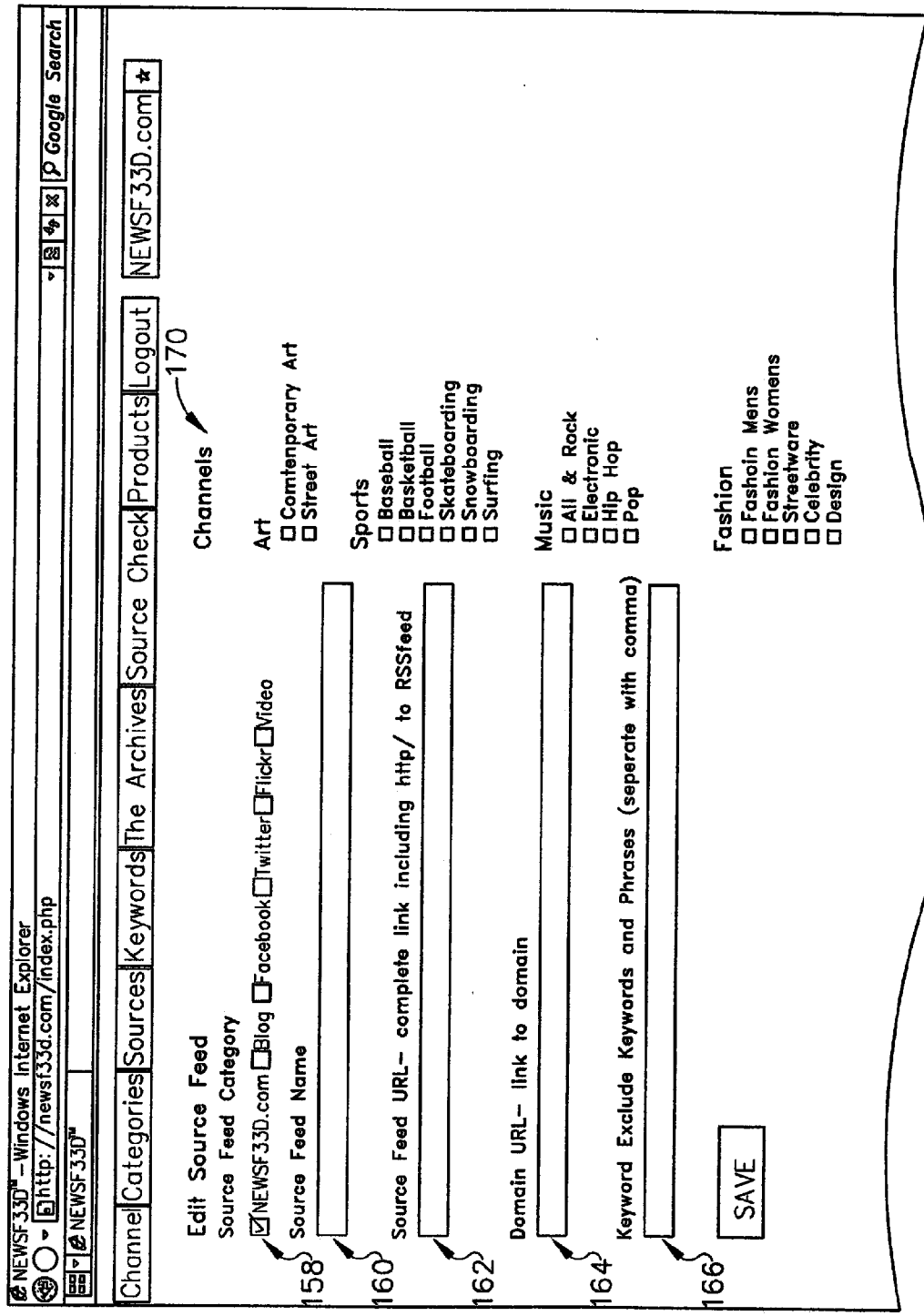
FIG. 7 is a representative administrator's graphical screen display of the invention showing how an administrator creates a new source feed.

The administrator can also create a source for a new source feed. By clicking on "Create Feed" 156, a screen is presented through which the administrator can modify the source feeds. An exemplar of such a screen is shown in FIG. 7. The administrator adds a new source feed as follows. First, the administrator checks the appropriate source feed category box 158. The source feed category identifies the type of source feed. Then the administrator enters the source feed name 160, the source feed URL 162, the domain URL 164, and keyword excludes 166. When a word or a phrase is entered as a keyword exclude, then an article in the source feed that contains the excluded keyword will not be archived or displayed on a user's screen, even if the source feed contains identified keywords. Thus, the keyword exclusion feature of the new source feed may control (i.e. an article containing the excluded keyword is not displayed even if other keywords in the keyword filter are in the article) or it may be subservient to the keyword search filter (i.e. an article containing the excluded keyword is archived or displayed as long as a keyword in the keyword filter is in the article). The administrator also selects the channels to which the source feed will be applied by checking the appropriate boxes under "Channels" 170. The new source feed filter is then stored in the database when the administrator clicks on the submit button.

Figure 9:
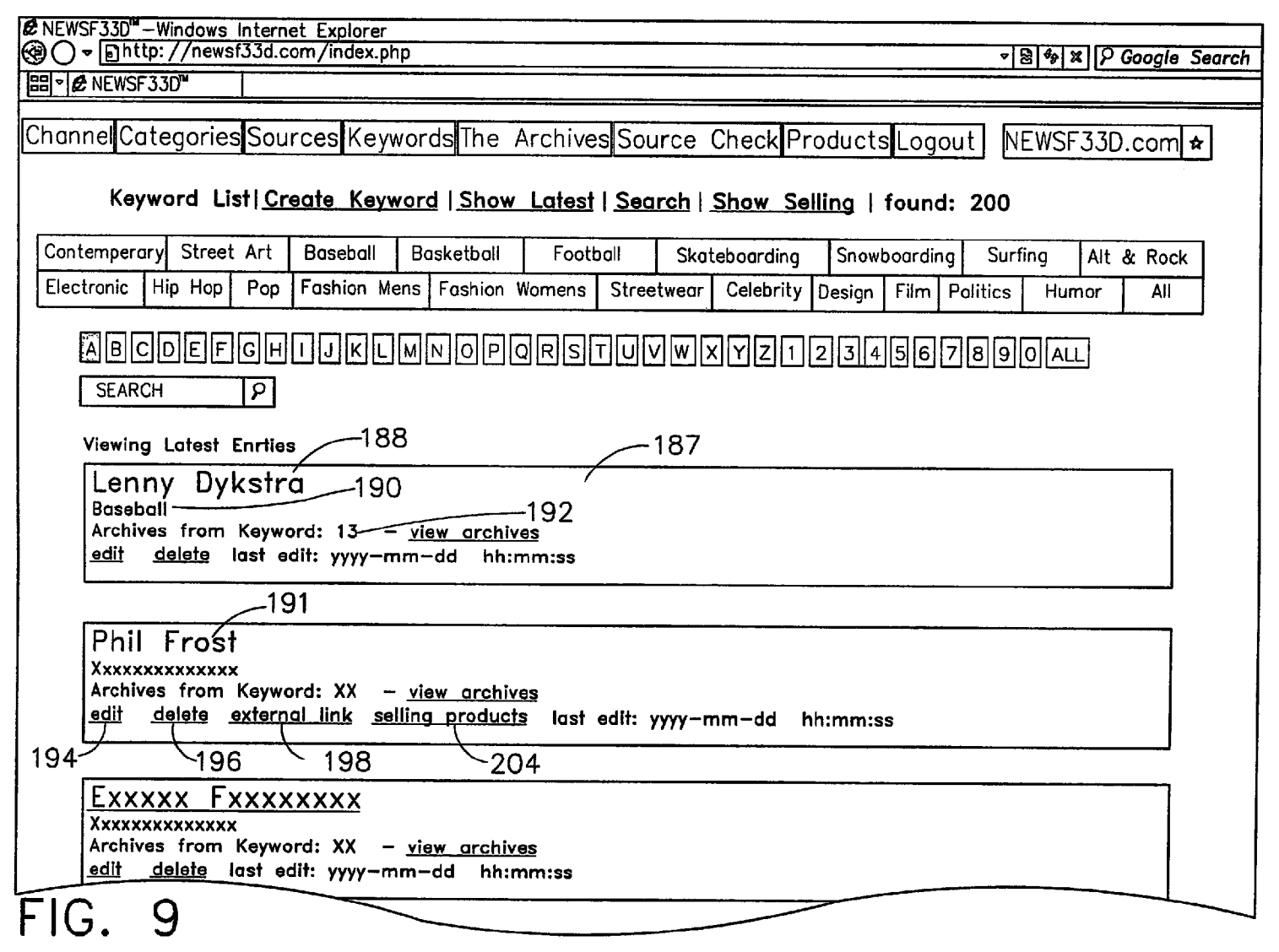

FIG. 9 shows an exemplar of a keyword list filters containing keywords that are used to search for information. As described later, each of the keywords may also include a channel attribute and other information relating to the keyword. For example, a display 187 shows the keywords "Lenny Dykstra" 188, the channel to which articles containing the keyword "Lenny Dykstra" will feed, "Baseball" 190, and a count showing how many articles related to Lenny Dykstra are archived, (13) 192. The keyword may also link to other buttons the administrator may use to modify the attributes of the keyword. For example, as shown with the "Phil Frost" 191 keyword, the administrator may edit 194, delete 196, connect the keyword to an external link 198, or connect the keyword to products 204 that may be related to the keyword. The keyword filters are received and stored in a database.

FIG. 10 shows a link where the administrator may create new keywords. To create a new keyword, the administrator enters the name keyword 206, whether the keyword relates to products to sell 207, additional search terms relating to the keyword 208, keywords that must be included 209, a threshold limit for the number of times the keywords must appear before the article will be archived 210, keywords to exclude 214, and an external keyword URL 216, and an external URL button wording 217. The keyword can be linked to a specific URL. For example, if the keyword is "Charlie Sheen", then a URL to Charlie Sheen's blog may be entered. The additional keyword function 208 might be used when the name keyword 206 could be known by other names. For instance, if the name keyword 206 is "precious metals", than additional keywords that may be used are gold, silver and platinum so that the searcher finds articles relating to precious metals even if they do not use that phrase but instead use specific names of precious metals. The exclude function can be used to exclude articles that include the name or additional keywords but also include the "exclude" keywords. For example, if a famous artist has just been arrested, the administrator may enter "arrested" as an exclude keyword to focus on articles discussing the artist's artistic accomplishments and exclude articles discussing the arrest. The administrator then selects the channels 219 that are to be associated with the keyword. After entering the data, the administrator selects the submit button 218 to create a new keyword. The new keyword filter is then received and stored into a database.

Figure 11A:
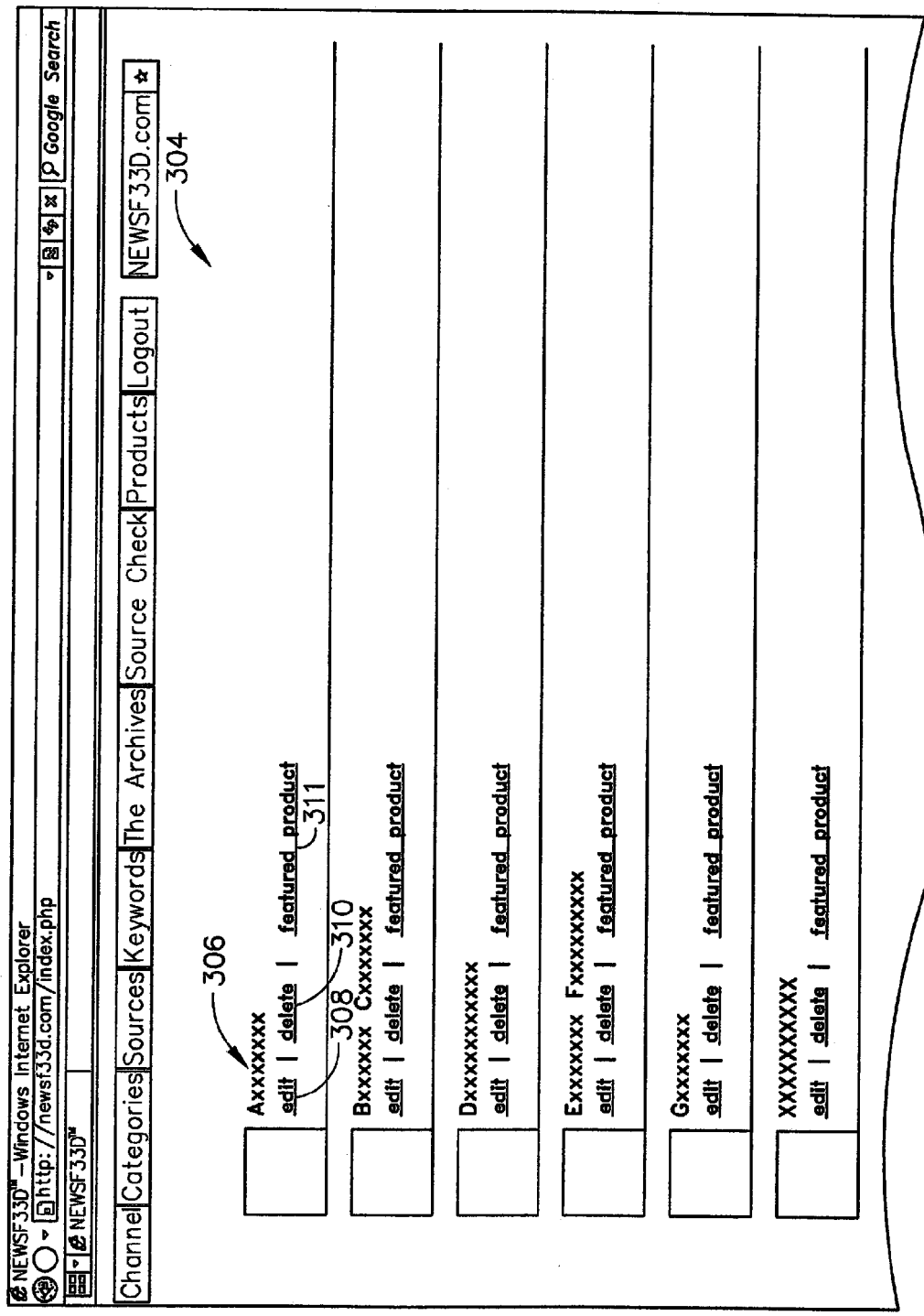
FIG. 11A is a representative administrator's graphical screen display of the invention showing a product list.
Figure 11B:
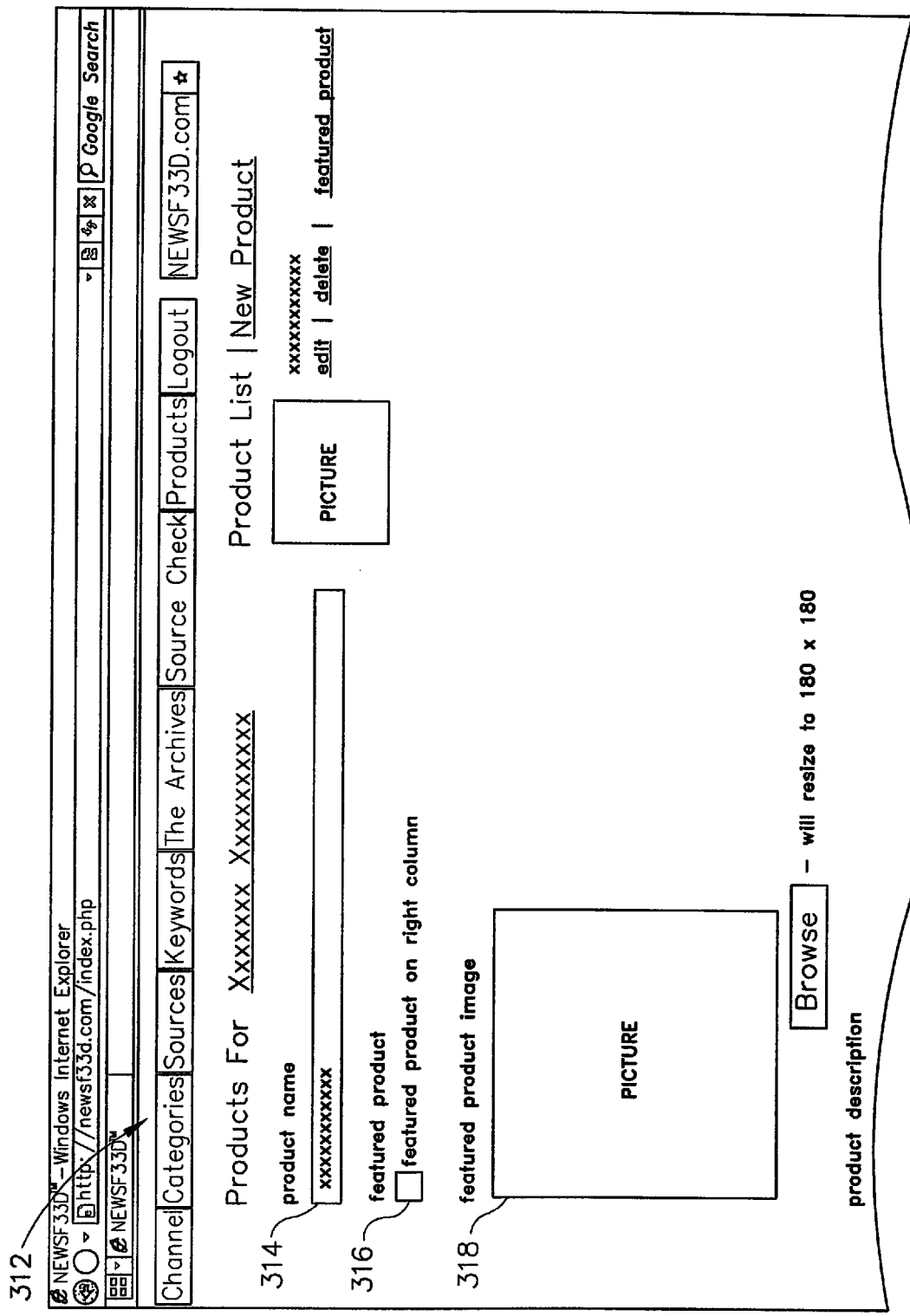
FIG. 11B is a representative administrator's graphical screen display of the invention showing how a product can be added to the product list.

FIG. 11A shows a list of products 304 that may be included for sale on the website. Each specific product 306 can be modified using the edit 308 and delete 310 buttons. FIG. 11B shows a screen 312 which appears when an administrator clicks on the "edit" button 308. The product can also be selected to be a featured product 311. A similar screen appears when an administrator chooses to create a new product. FIG. 11B shows a screen 312 which allows the administrator to enter a product name 314, check whether the product should be a featured product 316, and insert the product image 318, if desired.

In addition to the features allowing the administrator to modify the subject matter channels, data sources, and keywords, a user may also have access to the same utilities so that the user may input its own criteria to modify keywords, subject matter channels, and data sources. Allowing a user to modify the subject matter channels, data sources and keywords promotes community activity. A particular user's changes to the subject matter channels, data sources, and keywords may be applied to all users or it may become only part of the particular user's profile. Alternatively, as a filtering feature, the user's changes may be reviewed by an administrator prior to being applied to all users. Additionally, a suggestions feature can be used to allow a user to suggest keywords and sources to the administrator.

The system may also allow a user to modify the source feed filter, channel filter, and keyword filter by inputting its own criteria. Whether a user can modify the source feed filter, channel filter, keyword filter, or any other attributes can be controlled by a system such as requiring a user to register before modifying any features of the system. The user modifications may be applied to only the user who made the modifications, or they may apply to all users. Additionally, predetermined criteria may allow only certain users to make modifications that apply to all users. And a user may have the option of making its modification available to the general public, only to registered users, or it may keep it private.

In operation, a search engine searches those data feed sources included in the list of data feed sources in the database for articles containing the keywords included in the list of keywords stored in a database. Upon identifying articles, the aggregators separate the articles into channels.

Figure 14:
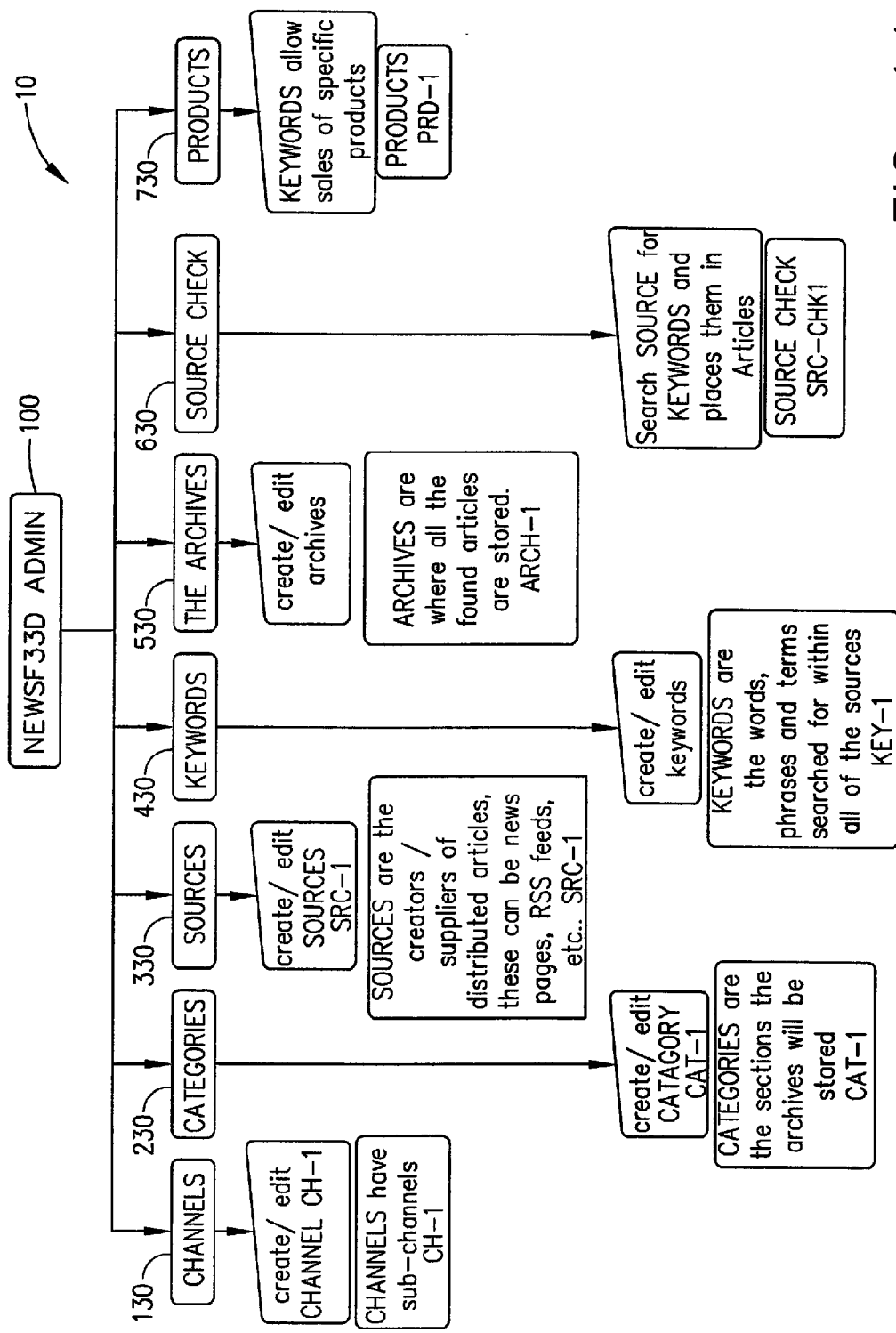
FIG. 14 shows the administrative function of one embodiment of the invention.

FIG. 14 shows the administrative architecture 10 of the news feed system, which could be considered a specialized aggregator. The administrative architecture 10 includes the administrative portion 100, and various modules within the administrative portion. These modules might include channels module 130, categories module 230, sources module 330, keywords module 430, archives module 530, source check algorithm module 630 and products module 730. Additional or less modules may be included. The administrator may perform a number of functions within each module.

Figure 15:
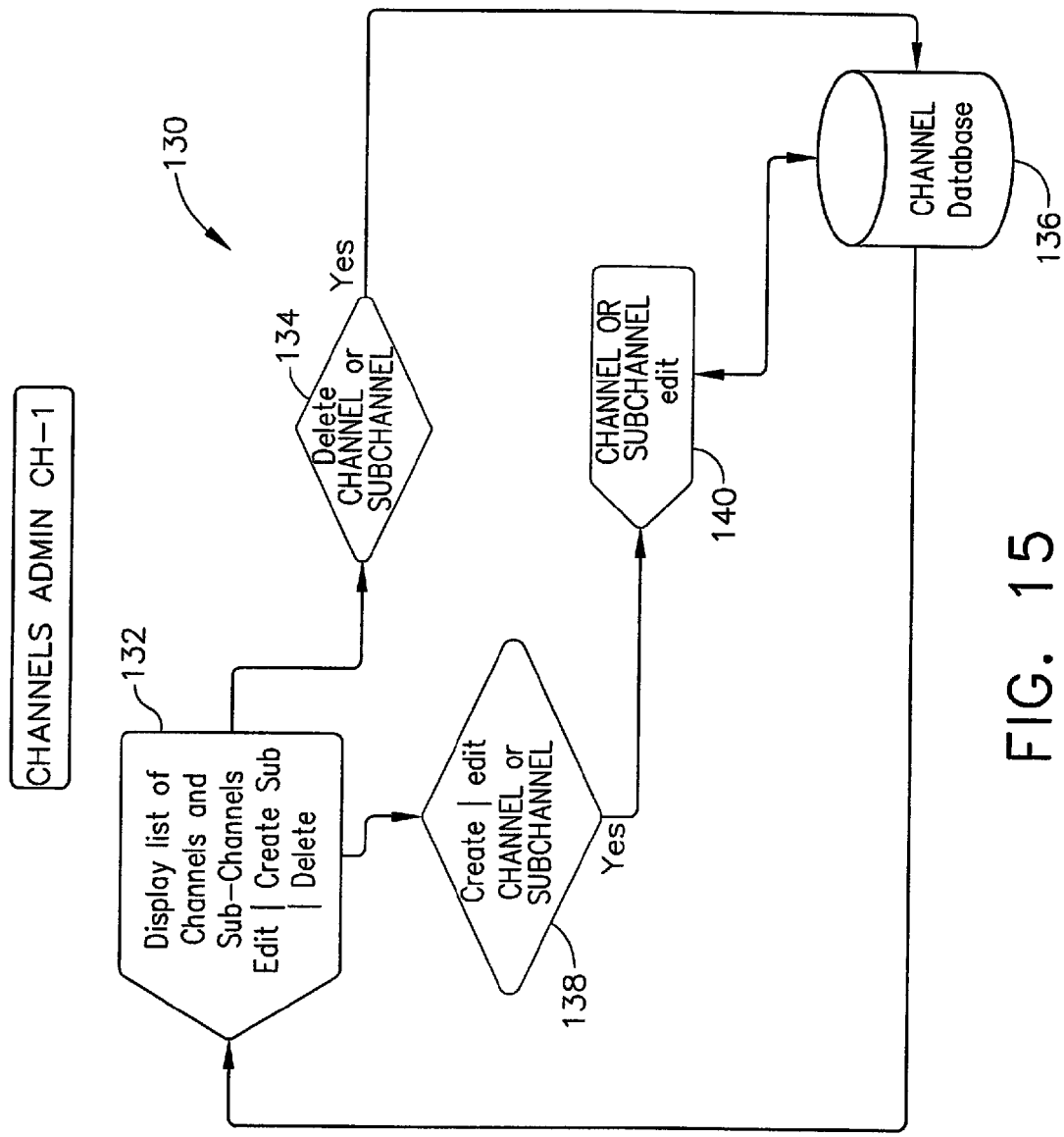
FIG. 15 shows a decision tree and workflow diagram for a channels administration of one embodiment of the invention.

As shown in FIG. 15, the administrator can create and edit channels in the channels module 130. In addition to the administrator creating and editing channels, a function may be provided whereby a user may create and modify subchannels. The channels module 130 displays a list 132 of channels and subchannels and allows the administrator to edit, create, or delete channels and subchannels. If administrator decides to delete a subchannel as shown in decision step 134, then the channel or subchannel is deleted from channel database 136. Alternatively, the administrator may create or edit a channel or subchannel in a create/edit decision step 138. If the administrator decides to create or edit a channel or subchannel the selected channel with the various edit features available for that channel is displayed by display 140. The administrator may then edit or create the channel or subchannel and store that information in the channel database 136.

Figure 16:
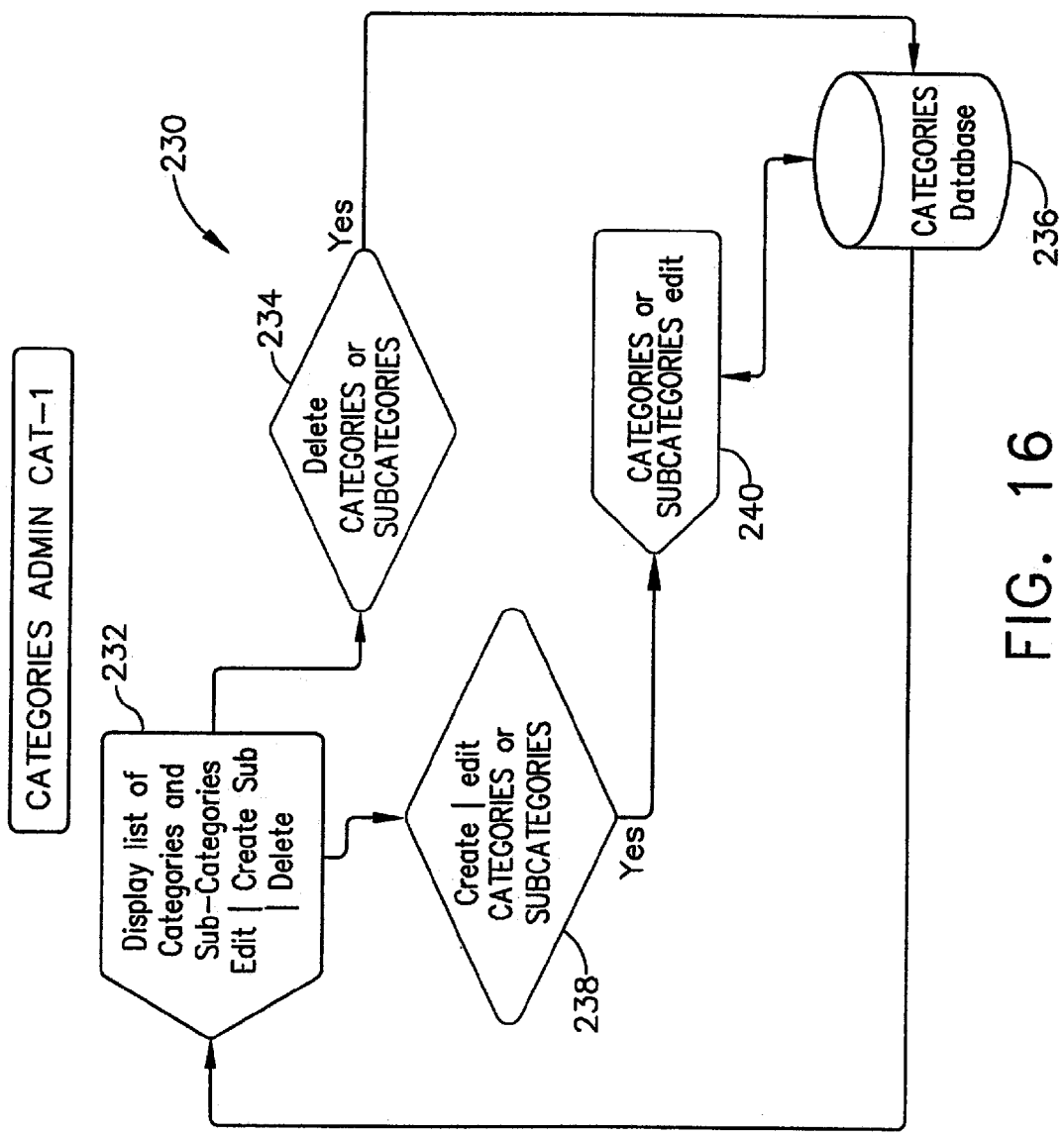
FIG. 16 shows a decision tree and workflow diagram for a categories administration of one embodiment of the invention.

FIG. 16 shows the categories module 230. The administrator can create and edit categories in the category module 230. In addition to the administrator creating and editing channels, a function may be provided whereby the administrator may modify and edit categories. The category module 230 displays a list of categories and subcategories 232 and allows the administrator to edit, create, or delete categories and subcategories. If the administrator decides to delete a category or subcategory as shown in decision step 234, then the category is deleted from category database 236. Alternatively, the administrator may create or edit a category or subcategory in a decision step 238. If the administrator decides to create or edit a category or subcategory, then the category or subcategory with the various edit features available for that category is displayed by display 240. The administrator may then edit or create the category or subcategory and store that information in the category database 236.

Figure 17:
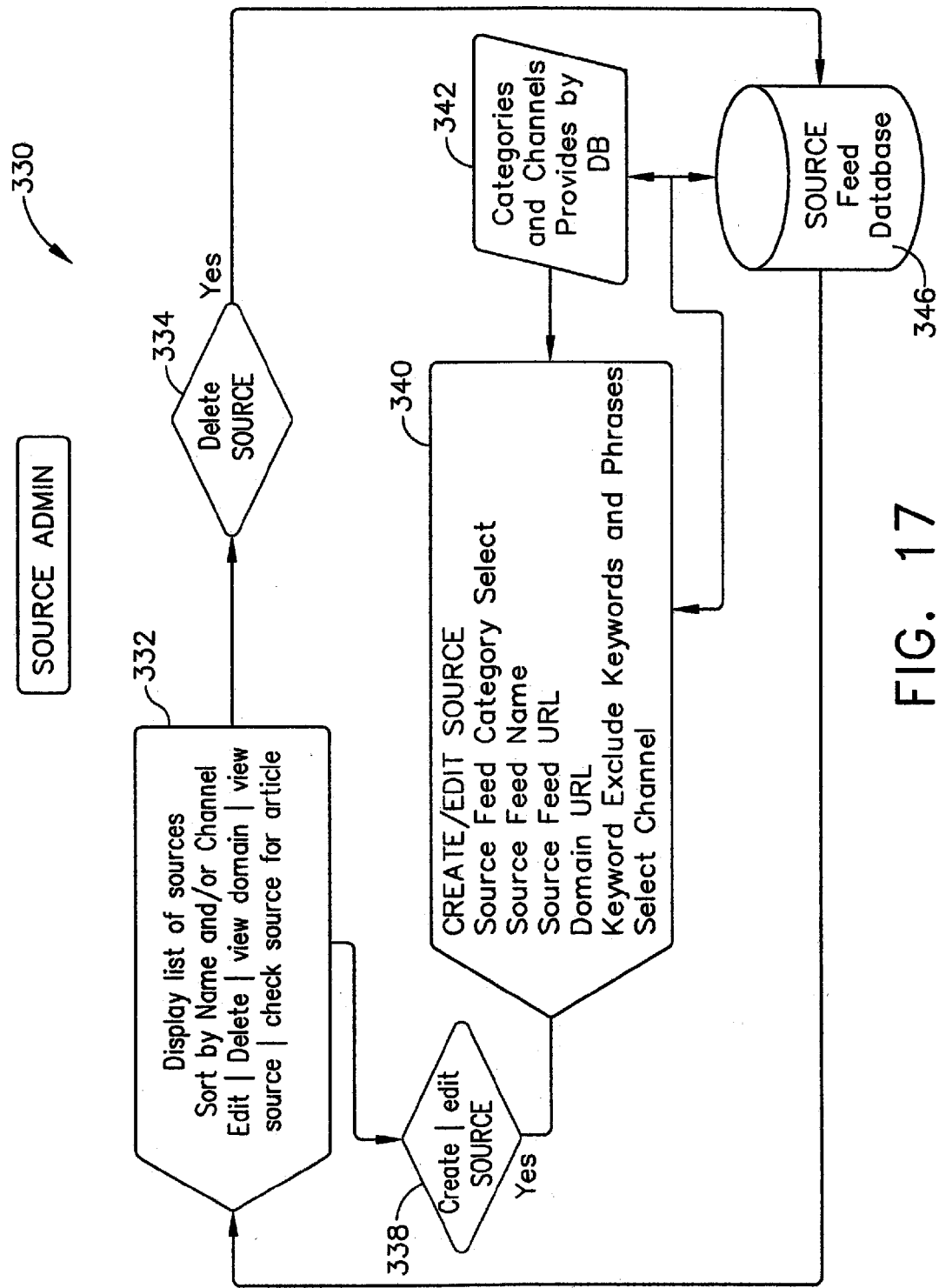
FIG. 17 shows a decision tree and workflow diagram for a sources administration of one embodiment of the invention.

FIG. 17 shows the source feeds module 330. With the source feeds module, the administrator can view a list of source feeds in a display window 332. The display window 332 allows the administrator to sort the list of sources by name or channel and provides the administrator with the option of editing, deleting, viewing the source domain, viewing the source feed, and checking the source for articles. Other administrative options may also be provided to the administrator in the display window 332. If the administrator chooses to delete a source feed 334, then the source feed is deleted from the database 346. Alternatively, the administrator may create or edit an existing source feed by way of create or edit source step 338. If the administrator chooses to edit or create a source feed, then the administrator is prompted by a create/edit source display window 340. The administrator enters the source feed name and the source feed URL in the display window. 340. The administrator can then select which categories and channels previously set up by the administrator, to which the source feed will apply. The categories and channels data to which the source is to be applied are inputted from the database 346 to the display window 340 by input step 342.

Figure 18:
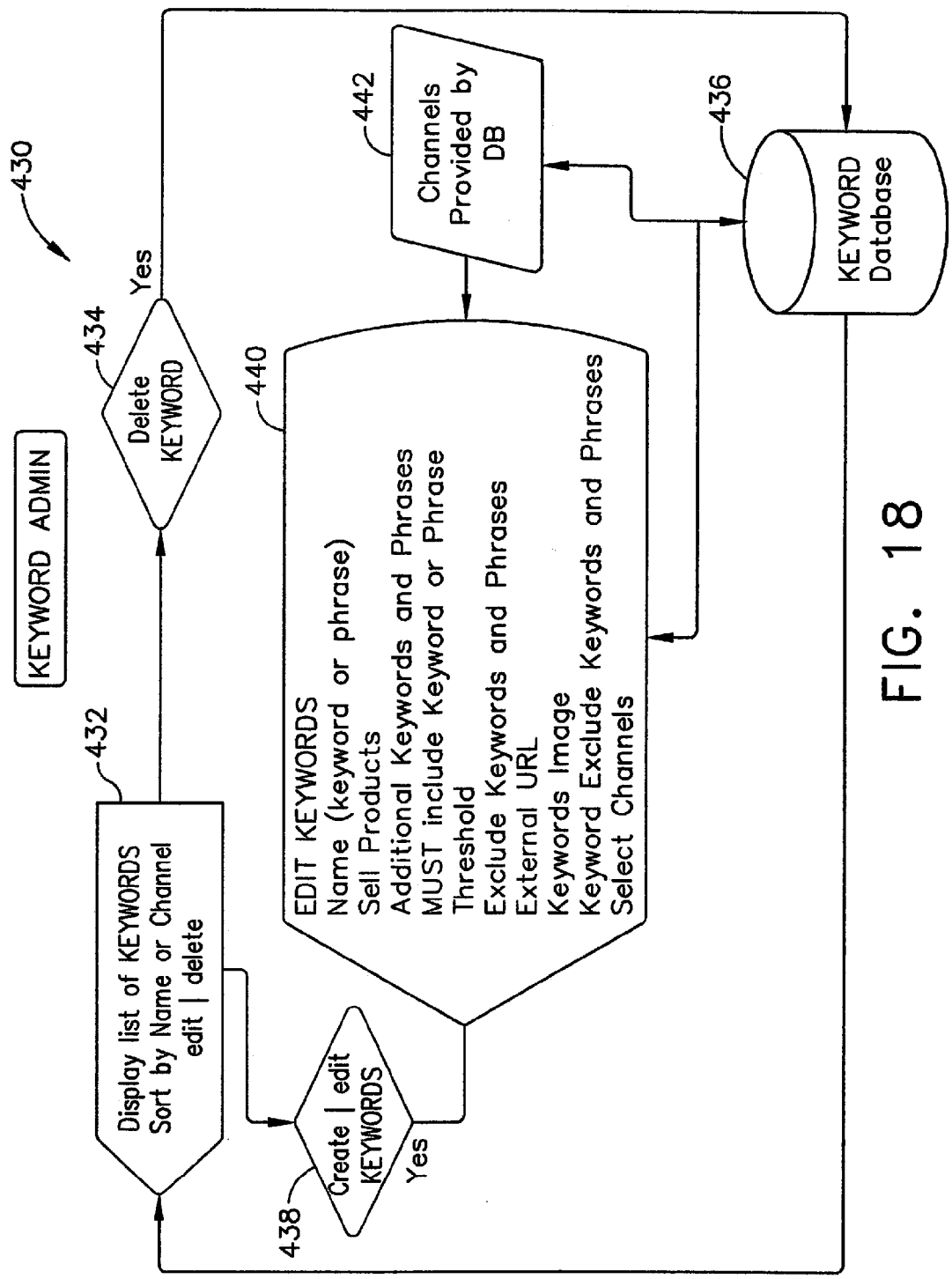
FIG. 18 shows a decision tree and workflow diagram for a keyword administration of one embodiment of the invention.

FIG. 18 shows the keyword administrator module. In the keyword administrator module 430 the administrator may display in a display window 432 a list of keywords sorted by name or channel and may choose to edit or delete those keywords. If the administrator chooses to delete the keywords through deletion step 434, then the keywords are deleted from the database 436. If the administrator decides to create or edit keywords, as depicted by decision step 438, then a display window 440 shows the various functions that may be preformed on the keywords. The channels to which the keyword is to be applied are inputted from the database 436 by input step 442. Operating from the display window 440, the administrator may, in addition to other steps, perform the following functions: (1) add additional keywords or phrases, (2) add or delete products, (3) add those keywords or phrases that must be included in the search, (4) the threshold number of keywords that must be met before the article will be included in the archive database, (5) those keywords or key phrases that if included in the article will result in the article being excluded from the archive database, (6) add external URLs and keyword images, and (7) select channels to be associated with the keywords.

Figure 19:
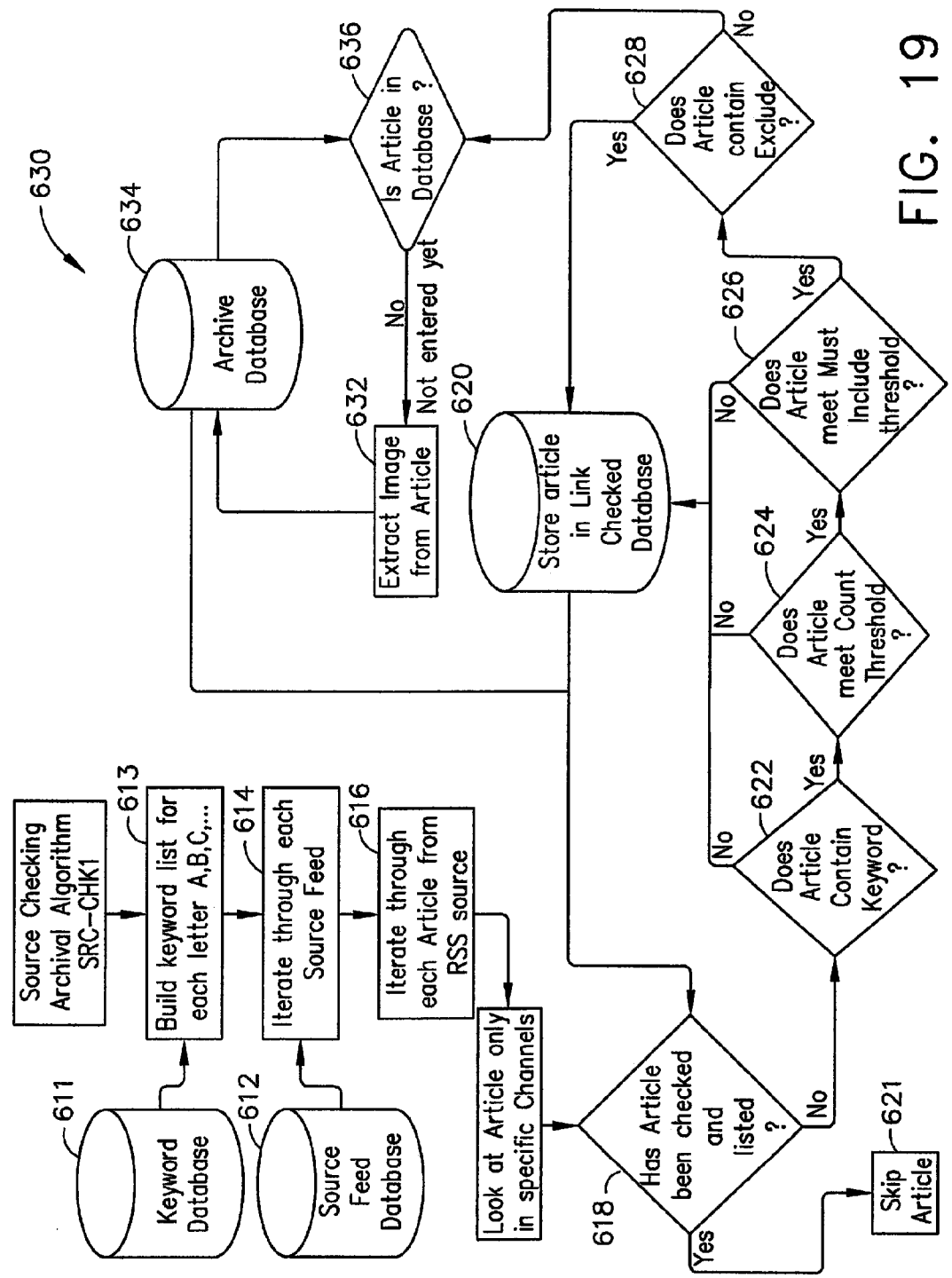
FIG. 19 shows a source checking algorithm of one embodiment of the invention.

FIG. 19 shows one embodiment of a source checking algorithm 630 used to evaluate articles for archiving. Keywords are inputted from the keyword database 611 to build a keyword list 613. Articles from various sources are retrieved and fed into the source feed database 612. Process 614 receives the source feed from the source feed database 612. Process 616 then iterates through each article to assess whether the article has been checked previously in decision step 618. In decision step 618, the article is checked against a checked database 620 containing articles that have been evaluated previously, but not included in an archive database 634 for a variety of reasons. If the article has been checked before and is stored in the checked database 620, then the article is skipped 621 and the process 616 iterates to the next article. If the article has not been stored in the checked database 620, then the article is compared to the keyword list 613 loaded from the keyword database 611 to assess whether the article meets certain keyword thresholds. First, the algorithm assesses whether the article contains any of the keywords with a keyword searcher 622. If it does not contain any keywords, then the article is stored in the checked database 620 and the process 616 moves to the next article. If the article does contain at least one keyword, then the algorithm assesses whether the article meets the count thresholds (i.e. the algorithm counts the number of times the keyword appears in the article and compares that count to the required threshold). 624. If the article does not contain the keyword enough times, then it is stored in the checked database 620, and the process 616 moves to the next article. If it does contain the threshold number of keywords, then the algorithm assesses whether the article includes the "must include" words 626. If the article does not include the "must include" keywords, then the article is stored in the checked database and the process 616 moves to the next article. If it does contain the "must include" words, then the algorithm assesses whether the article contains "exclude" keywords. 628. If the article contains the "exclude" words, then it is stored in the checked database. If the article does not include the "exclude" words, then the article is compared 636 to the archived database 634 to assess whether the article has already been stored in the archived database and made available to user. If it has already been stored, then the process ends. If the article has not been stored in the archive database, then process extracts article image 632 and stores it in the archive database 634.

Figure 20:
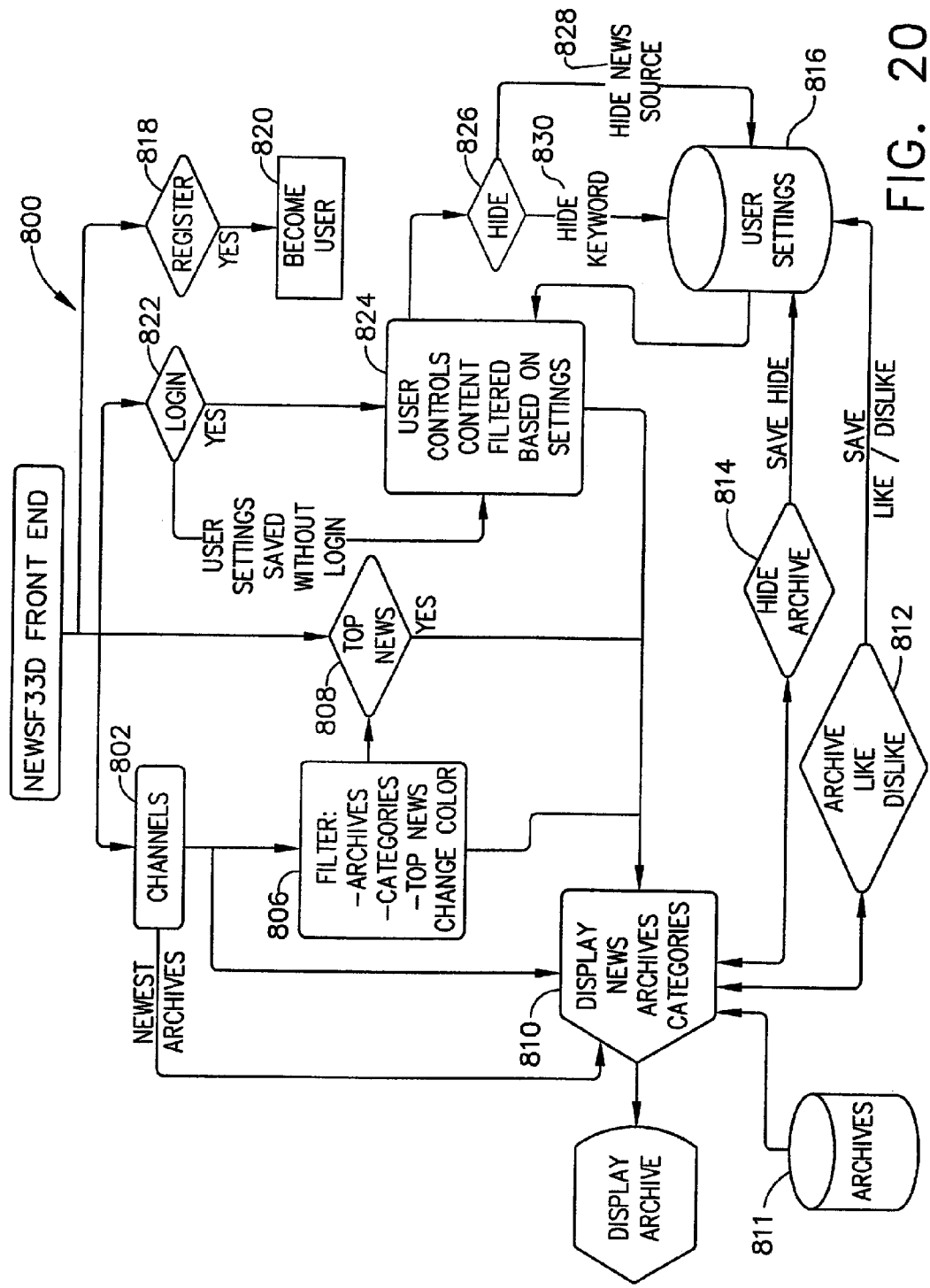
FIG. 20 shows a decision tree and workflow diagram for the user end of one embodiment of the invention.

The operation of the news feed system in depicted in FIG. 20. The front end 800 of the news feed system provides a user, typically a registered user, with various options when viewing the news feed front page. As depicted in FIG. 1B, the user has the option to select channels 802 such as art, music, skateboarding, or other channels that may have been set up previously. The user can then select to view information depending on certain filters such as top news or channels 806. Typically, if an operator selects a channel, then the options and information displayed, such as "Top News" will relate to that channel. If the user decides to view the top news 808, then the news archives are displayed in a display window 810. These news archives are loaded from the displayed news archives 811, and the user may make a decision to like or dislike 812 the displayed article and to hide the archive and future listings 814 with similar criteria. These decisions 812 and 814 can be stored in a user settings database 816.

Following a different path, if an operator has not registered to become a user, then the operator may do so at the front end of the news feed site. To become a user the operator decides to register 818 and thereby becomes a user 820. Some of the features described herein, such as like, dislike, hide, and unhide may require a user to be registered in order to use.

If the user is already a registered user, then the user may make the decision to log in 822 and proceed to the user controlled content 824. The user controlled content may include filter content based on settings established by the user of keywords, sources, channels and categories, among other items. Within the user control settings the user can decide to hide 826 articles based on certain criteria. For example, a user may hide the entire news source 828 or may hide all articles containing specific keywords 830. These filters are then stored in user settings 816.

The news feed system may also provide for color coding of the various channels. For instance, the art channel may have a color code of yellow. When the user clicks the art channel then the yellow color code flows throughout the screen to indicate to the user that they are on the art channel.

Also, the site may include a feature whereby a user can share articles with others on Facebook™, Twitter™, or other types of social media.

The news feed site may also include a recommendation section which, based on the user criteria, responses, likes and dislikes, assesses other websites, products, or information that may interest the user.

The news feed site can also include a social component which allows user to make their channels public to other viewers. In that manner, other people could search the users profile and created channels. In addition to the "Top News" section it could also have a "top users" section which would allow Twitter™ like functions and activity based tweets. Finally, the news feed site could have featured users, which could include highlighted users based on activity rankings, famous personalities, or famous sports stars, or any other manner by which one may assess a featured user.

Figure 21:
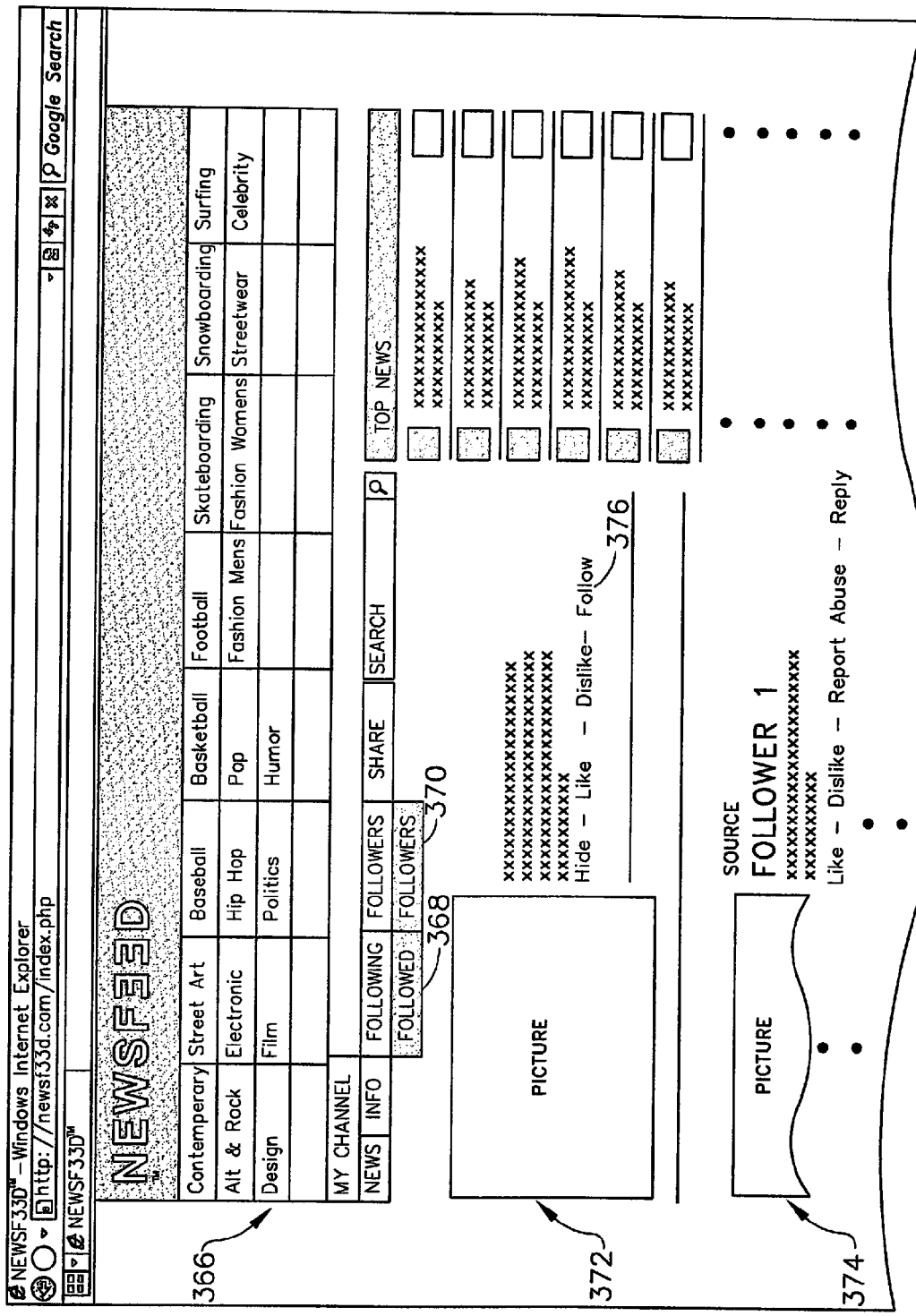
FIG. 21 is a representative graphical screen display of the invention showing a followers screenshot.
Figure 22:
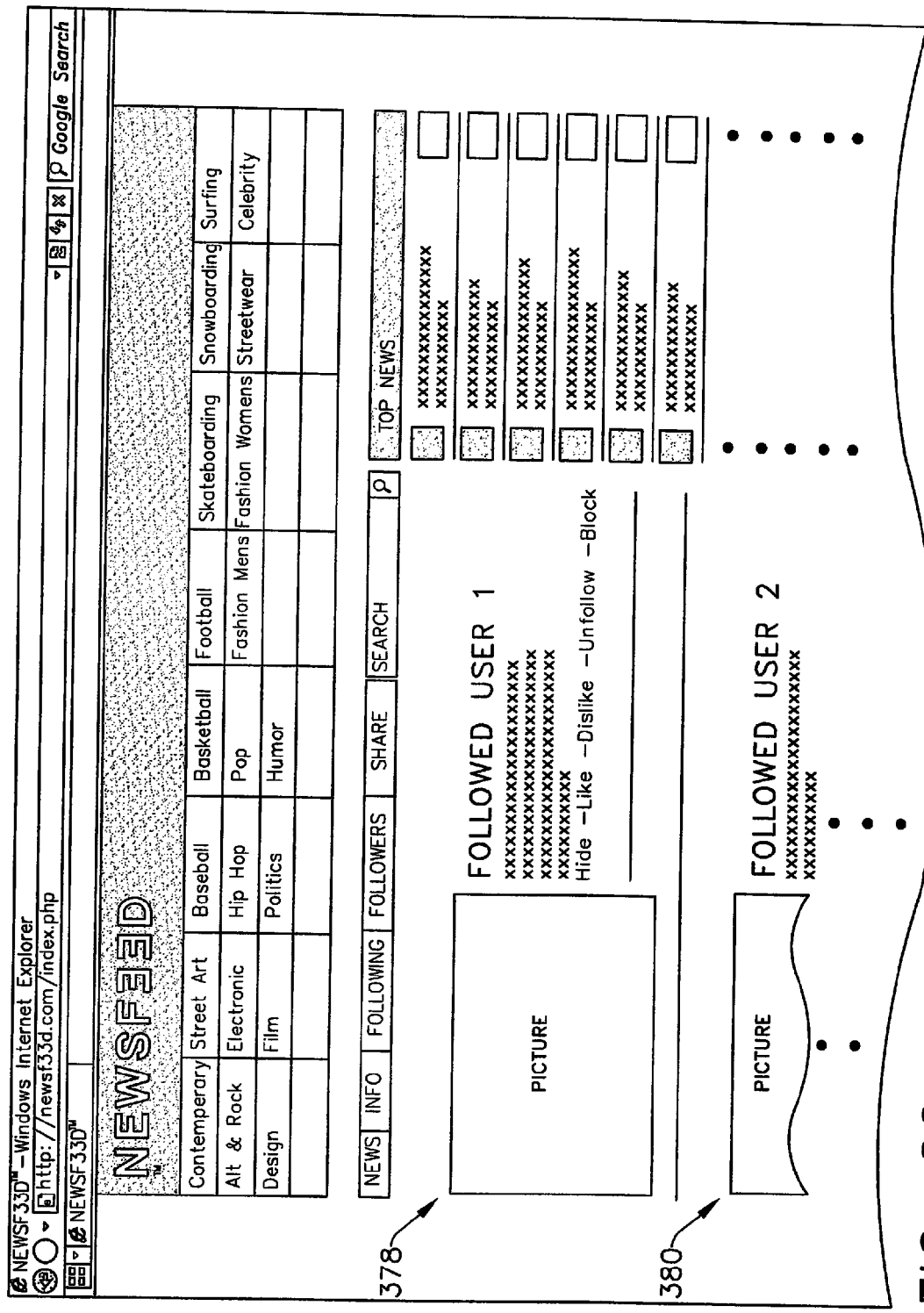
FIG. 22 is a representative graphical screen display of the invention showing a followers screenshot.

The website and application may also have a social networking component that allows users to follow each other and to comment on other user's articles. FIG. 21 shows one example of a social networking component comprising a user's personalized webpage showing followers of the user, a follower's webpage 366. The followed button 368 and the followers button 370 can be used by the user to switch between a followers page depicted in FIG. 21 and a followed page depicted in FIG. 22. The user's profile and channel 372 is provided with followers' comments and profile 374 below. Another user can choose to follow the user by selecting the "follow" button 376 in the profile section. The followed page of a user is depicted in FIG. 22. The followed page shows the user the profiles of the individuals being followed, such as followed user one 378 and followed user two 380.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention is therefore not limited to the specific details, representative apparatus and method, and illustrated examples shown and described. Accordingly, departures may be made from such details without departing from the scope or spirit of the invention.

I claim:

1. A method for providing a news feed website and application comprising the steps of:
   a. receiving and storing a list of data sources in a database, on a server having a processor and a memory, wherein each data source from the list of data sources is created by an administrator using a data source definition interface,
   b. receiving and storing a list of subject matter channels in a database, on a server having a processor and a memory, wherein each subject matter channel from the list of subject matter channels is created by the administrator using a subject matter channel definition interface,
   c. receiving and storing a list of name keywords in a database, on a server having a processor and a memory, wherein each name keyword from the list of name keywords is created by the administrator using a name keyword definition interface,
   d. assigning at least one subject matter channel to each name keyword from the list of name keywords, wherein for each name keyword from the list of name keywords, the step of assigning at least one subject matter channel to that name keyword is performed at least once prior to storing that name keyword as an element of the list of name keywords,
   e. assigning at least one subject matter channel to each data source from the list of data sources, wherein, for each data source from the list of data sources, the step of assigning at least one subject matter channel to that data source is performed at least once prior to storing that data source as an element of the list of data sources,
   f. determining a plurality of articles to store in an archives database by, for each article from a plurality of potential articles, performing a set of acts comprising:
      i. determining whether that article matches at least one subject matter channel from the list of subject matter channels, and
      ii. storing that article in the archives database only if it matches at least one subject matter channel from the list of subject matter channels
      wherein each article from the plurality of potential articles is obtained from a data source from the list of data sources,
   g. selecting a set of articles from the archives database for presenting to a user in a graphical news feed;
   h. transmitting, to a computer located proximate to the user, a set of data operable to configure the computer to present the graphical news feed comprising the selected set of articles to the user,
   i. receiving a first input from the user indicating a subset of the list of data sources to use when populating a user controlled news feed,
   j. receiving a second input from the user indicating a subset of the list of name keywords to use when populating the user controlled news feed,
   k. updating information stored in a user database indicating data sources from the list of data sources to use when populating the user controlled news feed based on the first input received from the user, and
   l. updating information stored in the user database indicating name keywords from the list of name keywords to use in populating the user controlled news feed based on the second input received from the user;
   wherein:
   A. the name keyword definition interface is operable by the administrator when defining a new or existing name keyword to:
      I. identify a set of additional words and phrases as associated with the new or existing name keyword;
      II. identify a threshold requirement for elements of the set of additional words and phrases appearing in an article for that article to be treated as matching the new or existing name keyword; and
      III. identify a set of exclusion words and phrases for determining that articles containing those words and phrases do not match the new or existing name keyword;
   B. the name keyword definition interface is further operable by the administrator when defining the new or existing name keyword to identify whether selection of an article identified as matching the new or existing name keyword should trigger display of a list of products for sale; and
   C. the method further comprises in response to receiving an input indicating selection of an article from the graphical news feed by the user, providing a list of products for sale related to a name keyword which the article was determined to match when it was stored in the archives database, wherein each product from the list of products is created by the administrator using a product definition interface.

2. The method of claim 1, wherein:
   a. the data source definition interface is operable by the administrator when defining a new or existing data source, to:
      i. identify an external URL from which the new or existing data source's articles can be obtained; and
      ii. identify one or more exclusion keywords for determining whether articles obtained from the external URL identified for the new or existing data source should potentially be included in the archives database; and
   b. determining the plurality of articles to store in the archives database comprises, for each article from the plurality of potential articles, excluding that article from the archives database in the event that that articles matches one or more exclusion keywords identified for the data source for which the external URL from which that article was obtained was identified.

3. The method of claim 1, wherein, each article from the plurality of potential articles is determined to match a subject matter channel when each of the following is true for a name keyword assigned to the subject matter channel:
   a. that article contains at least a threshold number of words and phrases identified by the administrator when defining the name keyword assigned to the subject matter channel;
   b. that article does not contain any exclude words or phrases identified by the administrator when defining the name keyword assigned to the subject matter channel;
   c. that article includes any must include words or phrases identified by the administrator when defining the name keyword assigned to the subject matter channel; and d. the name keyword assigned to the subject matter channel and the data source from which that article was obtained were assigned to at least one subject matter channel in common.

4. The method of claim 1, wherein the method further comprises providing a scoring system for users to rate news feeds.

5. A system comprising:
   a. a plurality of client computers;
   b. a network;
   c. a server computer; and
   d. one or more databases;
   wherein:
   A. the server computer, and each client computer from the plurality of client computers:
      I. comprises a processor and a memory;
      II. is coupled to the network; and
      III. is adapted to communicate via the network;
   B. the one or more databases store:
      I. a list of data sources, wherein each data source from the list of data sources is associated with an external URL from which that data source's articles can be obtained;
      II. a list of subject matter channels;
      III. a list of name keywords, wherein each name keyword from the list of name keywords is associated with a set of subject matter channels from the list of subject matter channels;
      IV. an archive consisting of articles obtained from external URLs associated with data sources from the list of data sources; and
      V. user information comprising data defining one or more user controlled content feeds, wherein the data defining the one or more user controlled content feeds indicates, for each of the one or more user controlled content feeds:
         a user who created that user controlled content feed;
         one or more data sources from the list of data sources to use when populating that user controlled content feed; and
         one or more name keywords from the list of name keywords to use when populating that user controlled content feed;
   C. the memory of the server computer stores data adapted to configure the server computer to perform a plurality of acts comprising:
      I. in response to receiving a data source definition interface request from an administrator via an administrator client computer, sending, to the administrator client computer, data source definition interface data adapted to configure the administrator client computer to present a data source definition interface, the data source definition interface being operable by the administrator to define the list of data sources by specifying, for a new or existing data source, one or more characteristics selected from a set of data source characteristics comprising:
         a set of subject matter channels from the list of subject matter channels associated with the new or existing data source; and
         an external URL from which the new or existing data source's articles can be obtained;
         wherein tools operable by the administrator to specify each characteristic from the set of data source characteristics are encoded in the data source definition interface data;
      II. in response to receiving a subject matter channel definition interface request from the administrator via the administrator client computer, sending, to the administrator client computer, subject matter channel definition interface data adapted to configure the administrator client computer to present a subject matter channel definition interface operable by the administrator to define the list of subject matter channels;
      III. in response to receiving a name keyword definition interface request from the administrator via the administrator client computer, sending, to the administrator client computer, name keyword definition interface data adapted to configure the administrator client computer to present a name keyword definition interface, the name keyword definition interface being operable by the administrator to define the list of name keywords by specifying, for a new or existing name keyword, one or more characteristics selected from a set of name keyword characteristics comprising a set of subject matter channels from the list of subject matter channels associated with the new or existing name keyword;
         wherein tools operable by the administrator to specify each characteristic from the set of name keyword characteristics are encoded in the name keyword definition interface data;
      IV. determining whether to add a potential article obtained from an external URL associated with a data source from the list of data sources to the archive based on whether the potential article matches at least one subject matter channel from the list of subject matter channels;
      V. in response to receiving a content feed request from a user via a user client computer, sending, to the user client computer, graphical content feed data adapted to configure the user client computer to present a graphical content feed, the graphical content feed populated with articles selected from the archive;
      VI. in response to receiving a user controlled content feed source definition request from the user, modifying a user controlled content feed indicated as being created by the user by data stored in the one or more databases by modifying which data sources are included in the one or more data sources indicated by data stored in the one or more databases as being data sources to use when populating the user controlled content feed; and
      VII. in response to receiving a user controlled content feed name keyword definition request from the user, modifying the user controlled content feed indicated as being created by the user by data stored in the one or more databases by modifying which name keywords are included in the one or more name keywords indicated by data stored in the one or more databases as being name keywords to use when populating the user controlled content feed.

6. The system of claim 5, wherein:
   a. the set of data source characteristics further comprises a set of exclusion keywords; and
   b. the data stored in the memory of the server computer is adapted to configure the server computer to, for each data source from the list of data sources having a set of exclusion keywords, exclude any articles obtained from the external URL identified for that data source which match that data source's set of exclusion keywords from storage in the archive.

7. The system of claim 5, wherein the list of data sources, the list of subject matter channels, and the list of name keywords are all stored in a single database.

8. The system of claim 5, wherein the list of data sources is stored in a source feed database, the list of subject matter channels is stored in a channel database, and the list of name keywords is stored in a keyword database.

9. The system of claim 5, wherein the set of name keyword characteristics for the new or existing name keyword comprises:
   a. a set of additional words and phrases associated with the new or existing name keyword;
   b. a threshold requirement for elements of the set of additional words and phrases appearing in an article for that article to be treated as a match; and
   c. a set of exclusion words and phrases for determining that articles containing those words and phrases do not match.

10. The system of claim 9, wherein
   a. the name keyword definition interface is operable by the administrator to identify whether selection of an article identified as matching the new or existing keyword should trigger display of a list of products for sale;
   b. the plurality of acts the data stored in the memory of the server computer is adapted to configure the server computer to perform comprises, in response to receiving an input indicating selection of an article from the user client computer, when the article is associated with information indicating that its selection should trigger display of the list of products for sale, sending the user client computer data adapted to cause the user client computer to display of the list of products for sale.

11. The system of claim 5, determining whether to add the potential article to the archive based on whether the potential article matches at least one subject matter channel from the list of subject matter channels comprises determining whether the potential article:
   a. the potential article contains at least a threshold number of words and phrases associated with a name keyword from the list of name keywords;
   b. the potential article does not contain any exclude words or phrases associated with the name keyword from the list of name keywords;
   c. that potential article includes any must include words or phrases associated with the name keyword; and
   d. the name keyword and the data source associated with the external URL from which the potential article was obtained were assigned to at least one subject matter channel in common.

12. The system of claim 5, wherein the plurality of acts the data stored in the memory of the server computer is adapted to configure the server computer to perform comprises providing a scoring system for users to rate content feeds.

\* \* \* \* \*